(12) United States Patent
Dornfeld

(10) Patent No.: US 7,549,441 B2
(45) Date of Patent: Jun. 23, 2009

(54) ENERGY DISSIPATING INLET FOR CLARIFIERS

(75) Inventor: Richard L. Dornfeld, Aurora, IL (US)

(73) Assignee: McNish Corporation, Aurora, IL (US)

(*) Notice: Subject to any disclaimer, the term of this patent is extended or adjusted under 35 U.S.C. 154(b) by 327 days.

(21) Appl. No.: 11/421,914

(22) Filed: Jun. 2, 2006

(65) Prior Publication Data

US 2006/0278578 A1 Dec. 14, 2006

Related U.S. Application Data

(60) Provisional application No. 60/688,960, filed on Jun. 9, 2005.

(51) Int. Cl.
*F16L 41/00* (2006.01)
*B01D 21/00* (2006.01)
*B01D 17/00* (2006.01)

(52) U.S. Cl. .................. 137/561 A; 210/528; 210/801; 210/519

(58) Field of Classification Search ................. 210/513, 210/519, 520, 528, 801; 137/296, 561 A
See application file for complete search history.

(56) References Cited

U.S. PATENT DOCUMENTS

| 2,874,842 | A | * | 2/1959 | Milos | 210/703 |
| 3,175,692 | A | * | 3/1965 | Vrablik | 210/519 |
| 3,539,051 | A | * | 11/1970 | Stone | 210/520 |
| 3,804,260 | A | * | 4/1974 | Crowley | 210/513 |
| 6,276,537 | B1 | * | 8/2001 | Esler et al. | 210/519 |
| 6,736,275 | B2 | * | 5/2004 | Schneider et al. | 210/519 |
| 7,378,027 | B2 | * | 5/2008 | Zhou | 210/801 |
| 2004/0020847 | A1 | * | 2/2004 | Wright | 210/519 |

* cited by examiner

*Primary Examiner*—John Rivell
*Assistant Examiner*—Atif H Chaudry
(74) *Attorney, Agent, or Firm*—Barnes & Thornburg LLP

(57) ABSTRACT

A fluid inlet for waste water treatment equipment adapted to dissipate energy of a fluid that flows through the fluid inlet. The fluid inlet includes a bottom wall, a side wall and a plurality of spaced apart ports. The ports are in fluid communication with a chamber formed by the bottom wall and the side wall. Directional deflectors are respectively associated with each port. The directional deflectors of adjacent pairs of ports direct respective flows of fluid from the adjacent pair of ports toward one another such that the respective fluid flows from adjacent pairs of ports impinge upon one another and thereby dissipate energy.

30 Claims, 24 Drawing Sheets

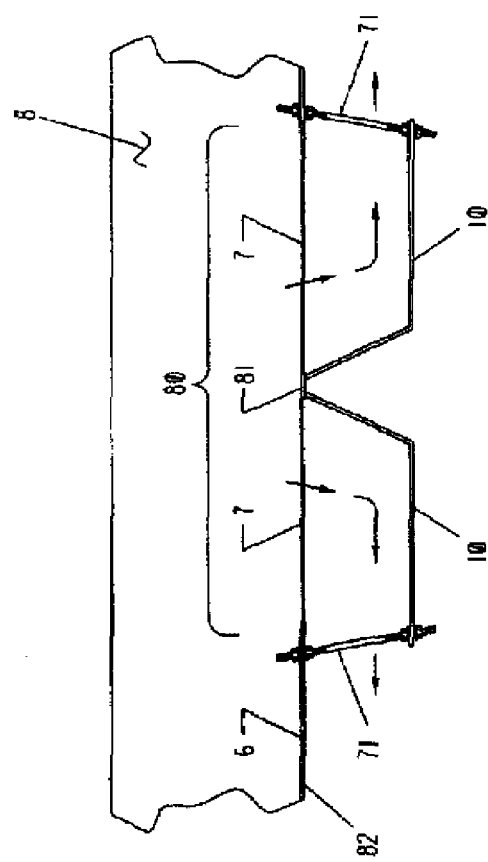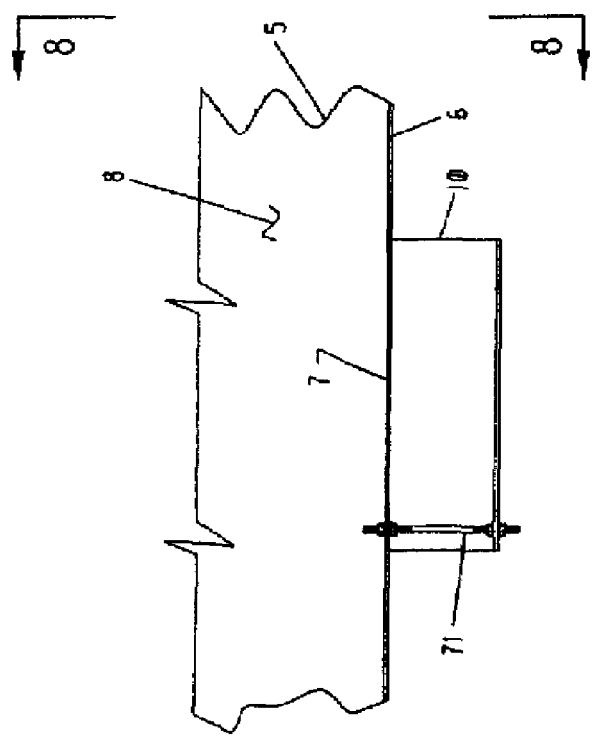

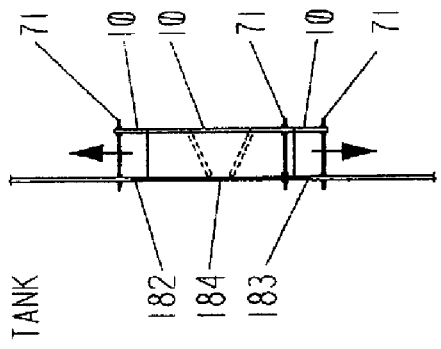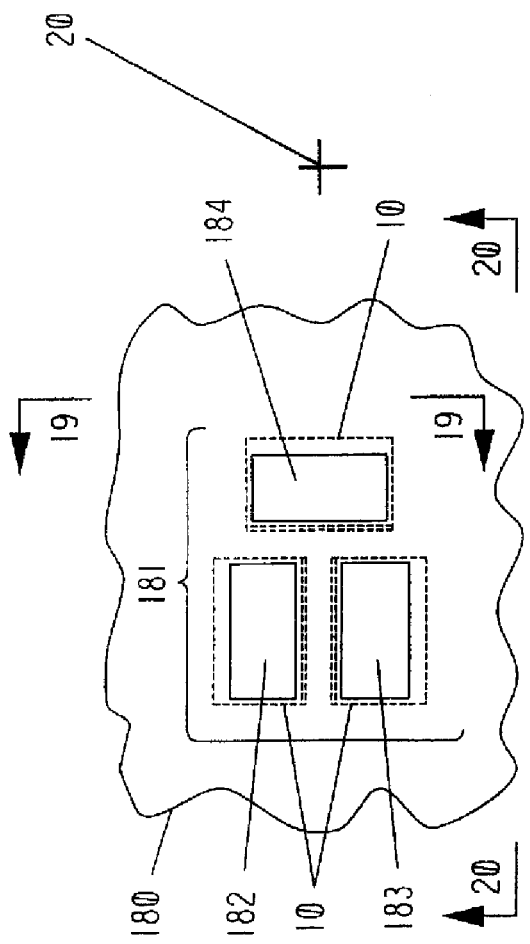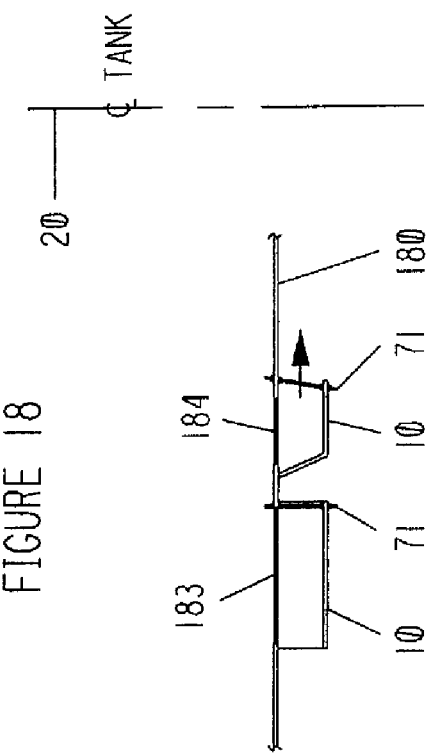

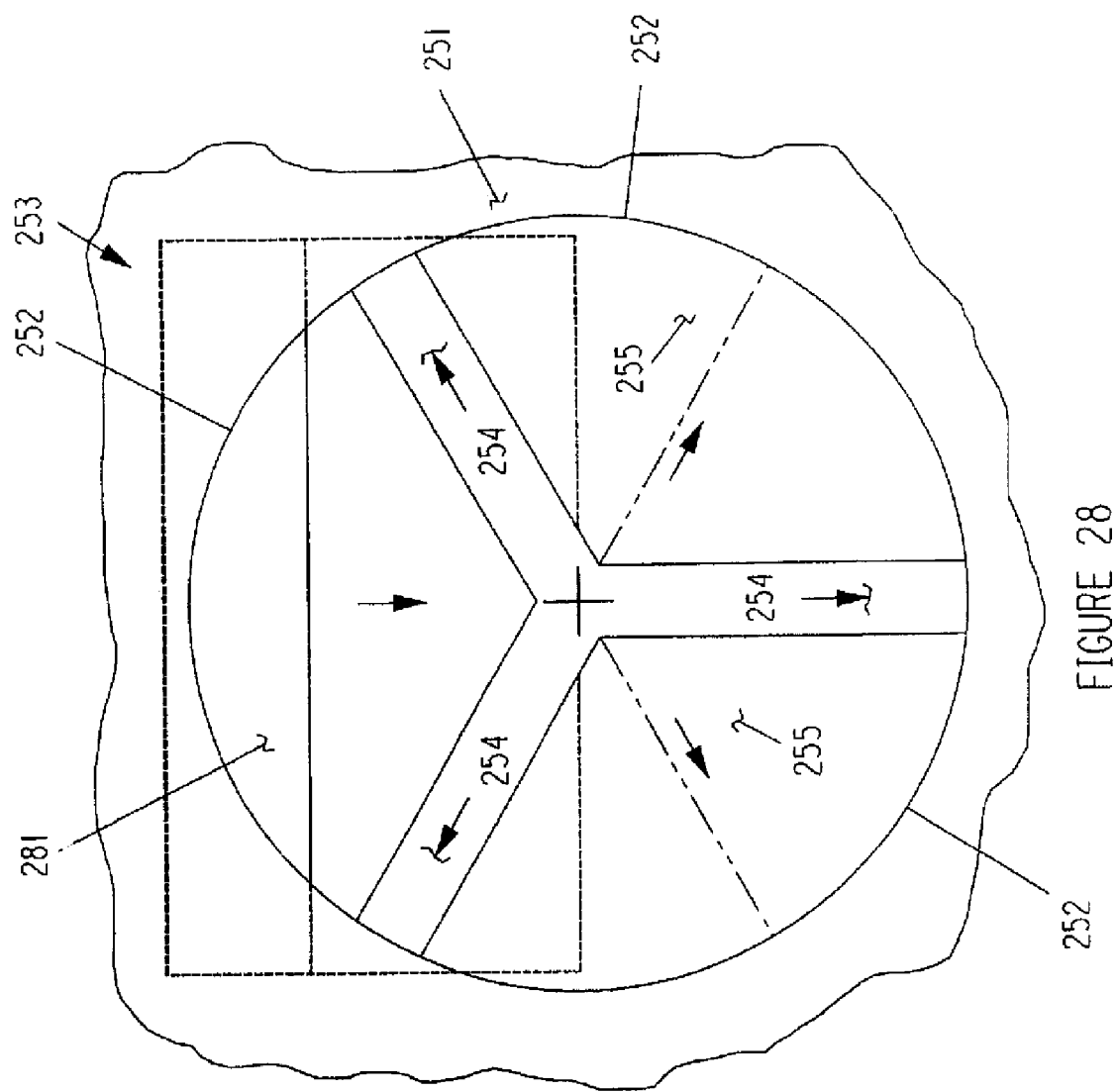

ENERGY DISSIPATING INLET FOR CLARIFIERS

RELATED APPLICATIONS

This application claims the benefit of U.S. Provisional Application No. 60/688,960, filed Jun. 9, 2005.

BACKGROUND

This disclosure relates generally to water and wastewater treatment equipment and more particularly to energy dissipating fluid inlets for use with clarifiers that are used for clarifying water and wastewater through sedimentation of flocculated and suspended solids. In particular the disclosure is directed to a method and apparatus for evenly and uniformly distributing and dissipating the inlet velocity or energy of the fluid influent that is directed into a clarifier in order to enhance sedimentation of the suspended, flocculated solids and precipitated dissolved solids carried by the influent.

In the treatment of water and wastewater, clarifiers are commonly used for the separation and settling of solids in order to clarify the liquid. In order for some solids to settle, particulates in the influent must be allowed to flocculate and form larger floc that can be more readily settled. The influent is typically introduced into the clarifier through an influent feed structure. The influent energy must be dissipated after flocculation has occurred to prevent shearing of the enlarged floc particles and to enhance sedimentation. The influent must be evenly and uniformly distributed as it enters the clarifier in order to prevent short circuiting of the desired flow path resulting in carry over of solids that would have otherwise settled out of the fluid.

To this end various methods and mechanisms for distributing flow and reducing the process stream velocity or energy have been developed. In rectangular clarifiers the feed structure may take the form of a feed pipe or a feed trough. The influent is admitted into the clarifier through ports that may be vertically or horizontally oriented in the feed structure. The influent may be redirected upon leaving the port by a deflector or a series of deflectors. Alternatively, the influent may be admitted without redirection.

In a circular clarifier the feed structure may take the form of a central influent column, a feed pipe, or a feed trough. An inlet well, that takes the form of a cylindrical ring and a bottom wall generally centered in the circular clarifier, receives influent. In order to enhance flocculation influent energy is required; however, this energy impedes sedimentation or settling of floc. It is helpful to minimize the energy of the influent that enters the inlet well to enhance settling and reduce shearing of the floc particles after they have been formed. Even and uniform distribution of the influent fluid into the clarifier basin reduces short circuiting and carry over of settleable solids into the effluent.

The energy dissipating and uniform distribution of the inlet of the current disclosure as applied to circular clarifiers overcomes the lack of variation or adaptability between tangential or rotational, radial or longitudinal, and impinging flows found in the prior art. This is accomplished with less structure and therefore less expense than the structures of the prior art. Flows can be adapted to the process requirements to combine any or all of tangential, radial, longitudinal, and impinging and non-impinging flows to dissipate energy. Applied to circular clarifiers, unpaired tangential flows from adjacent port sets establishes fluid rotation about the basin vertical center axis. Radial flows resulting from ports selectively adjusted establish fluid motion toward or away from the basin vertical center axis. Additionally, flow can be directed vertically upward or downward.

Applied to rectangular clarifiers, the energy dissipating and uniform distribution inlet of the current disclosure overcomes the lack of variation or adaptability between rotational, longitudinal, impinging, and non-impinging flows found in the prior art. This is accomplished again with less structure and therefore less expense than the structures of the prior art. Flows can be adapted to the process requirements to combine any or all of rotational, longitudinal, impinging, and non-impinging flows to dissipate energy and uniformly distribute the influent stream. Additionally, flow can be directed vertically upward or downward as well as longitudinally toward either end of the basin.

Thus the inlet arrangement of the current disclosure overcomes the disadvantages of the previous designs while maintaining flexibility and at reduced cost of materials and fabrication compared to the previous designs as applied to circular and rectangular clarifiers.

These goals are obtained by dividing the flow through an inlet side wall port into a plurality of flow streams. This is accomplished in the simplest arrangement by dividing the flow through the port into two flow streams by placing deflectors substantially centered on the port and supported from the well side wall by an attachment device. The attachment device and the deflectors then divide the initial flow through the port into two substantially equal flow streams that can be independently directed. Thus the flow is divided and redirected into more evenly and uniformly distributed flow streams, but also may be directed in any one of several directions to dissipate energy, effect fluid rotation or stream impingement of adjacent flow streams from adjacent ports.

It should be understood that the flow through the port can be likewise divided into a larger number of flow streams. The reasonable upper limit on the number of flow streams developed may be three or four for most applications, though in some applications the number of flow streams developed may be considerably higher.

Further, the port may itself be divided into a plurality of smaller ports having a total area substantially the same as the original port. This may be accomplished by ligatures, which then subdivide the original port area into smaller sub-ports. The deflector attachment devices may then also be attached to the ligature or to the wall beyond the ports. Clusters or groupings of at least two sub-ports would then replace the original single port. Additionally, a similar division of influent flow can be accomplished with ports and flow through the bottom wall of the inlet well.

SUMMARY OF THE INVENTION

A fluid inlet for dissipating energy of a fluid that flows through the fluid inlet. The fluid inlet includes a bottom wall and a first side wall extending upwardly from the bottom wall. The first side wall and the bottom wall form a chamber. The fluid inlet may also include a second side wall that extends upwardly from the bottom wall and that is spaced apart from the first side wall such that the chamber is formed between the first and second side walls. The fluid inlet includes a plurality of spaced apart ports. The ports may be located in any one or more of the first side wall, second side wall and bottom wall. The ports are in fluid communication with the chamber. A directional deflector is respectively associated with each port. The directional deflectors of adjacent pairs of ports are adapted to direct respective flows of fluid from the chamber and the adjacent pairs of ports toward one another such that the respective fluid flows from the adjacent pairs of ports impinge upon one another and thereby dissipate energy. The first side wall, second side wall and bottom wall may each include a plurality of port clusters, wherein each port cluster includes a plurality of ports located closely adjacent to one another. The ports in a port cluster may be separated from one another by a ligature. The directional deflectors may be moveably attached to the fluid inlet. Two directional deflectors may be associated with a port such that the directional deflectors extend across the port to divide the flow of fluid through the port into two fluid streams thereby redirecting the flows of the two flow streams.

BRIEF DESCRIPTION OF THE DRAWING FIGURES

FIG. 7 is a side elevational cross-sectional view of the inlet well bottom wall showing ports and directional deflectors of the inlet well in FIGS. 2 and 5.

FIG. 8 is a cross-sectional view of the ports, directional deflectors, and the bottom wall of the inlet well of FIG. 7.

FIG. 18 shows a group of three bottom ports and directional deflectors attached to the wall of a well or trough for impinging and radial discharge flow streams.

FIG. 19 is a cross-sectional view taken along line 19-19 of FIG. 18.

FIG. 20 is a cross-sectional view taken along line 20-20 of FIG. 18.

FIG. 28 is a plan view of a triple port cluster wherein the ports are circular segments, two directional deflectors are folded circular segments, and a third directional deflector is a folded rectangle.

DETAILED DESCRIPTION

Figure 1:
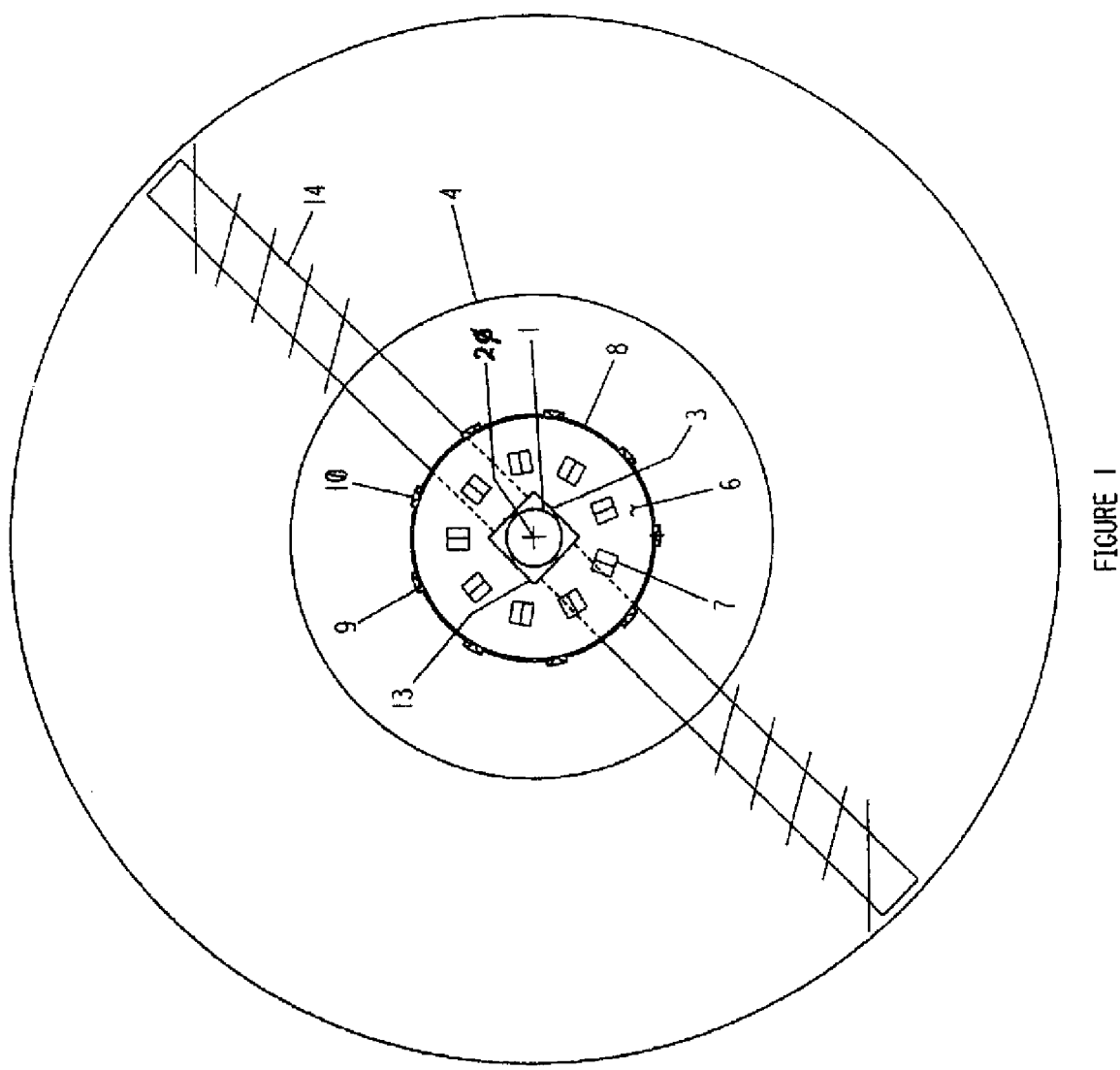
FIG. 1 is a plan view of a circular clarifier including an energy dissipating uniform flow distributing inlet of the current disclosure.
Figure 2:
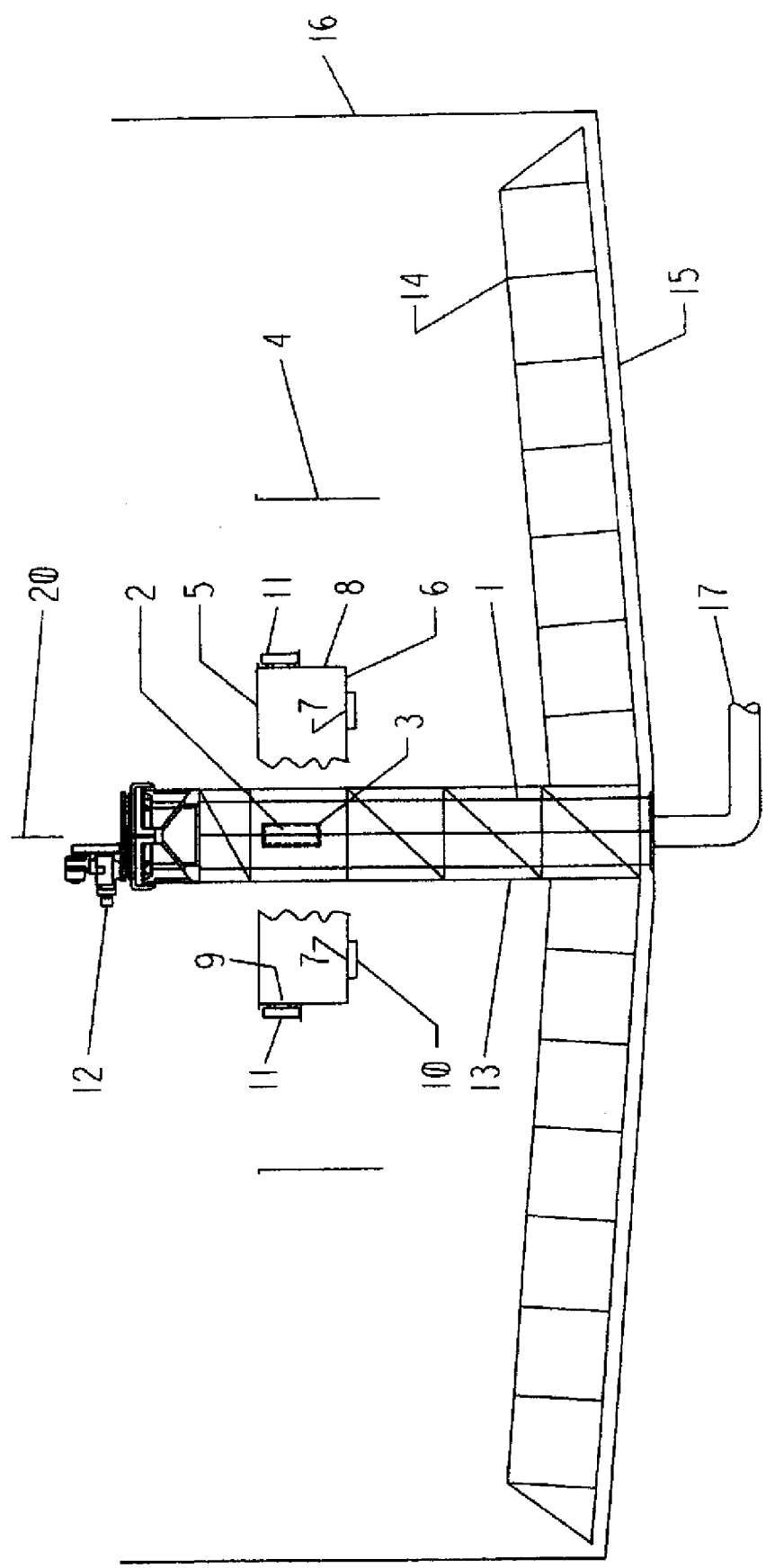
FIG. 2 is a partial cross-sectional elevation view of the clarifier of FIG. 1.

FIGS. 1 and 2 show a circular clarifier having a basin or tank with a generally cylindrical side wall 16 that extends about a generally vertical central axis 20 and a bottom wall 15 that substantially encloses the bottom end of the side wall 16. A generally cylindrical center pier 1 extends upwardly along the axis 20 from a bottom end that is attached to the center of the tank bottom wall 15. The center pier 1 includes a hollow chamber that is in fluid communication with a bottom influent pipe 17. The center pier 1 includes a plurality of pier inlet ports 2 spaced above the tank bottom wall 15. Each pier inlet port 2 may be provided with a respective directional deflector 3. A drive mechanism 12 is a connected to the top end of the center pier 1. The drive mechanism 12 may include a spur gear, a gear reducer, and an electric motor. A drive cage 13 extends downwardly from the drive mechanism 12 to a bottom end located adjacent the tank bottom wall 15. The center pier 1 is located generally concentrically within the drive cage 13. One or more rake arms 14 extend outwardly from the bottom end of the drive cage 13 to a position adjacent the side wall 16 of the tank. The rake arms 14 may include rake members and squeegees for scraping the bottom wall 15 of the tank. The drive mechanism 12 is adapted to selectively rotate the drive cage 13 and rake arms 14 about the central axis 20 with respect to the center pier 1 and tank. The clarifier includes a generally cylindrical feed well 4 having a side wall with an open top and bottom. The feed well 4 extends generally concentrically about the central axis 20 and may be stationarily supported by the clarifier side wall 16, or may be supported by the drive cage 13 and/or rake arms 14 for rotation about the axis 20.

The clarifier also includes an energy dissipating fluid inlet, such as an inlet well 5 that extends generally concentrically about the central axis 20 and that is located within the feed well 4. The inlet well 5 is connected to the drive cage 13 for conjoint rotation with the drive cage 13 about the axis 20. The inlet well 5 includes a generally planar and circular bottom wall 6. The center pier 1 extends through the center of the bottom wall 6 and the bottom wall 6 is rotatably sealed to the center pier 1. The inlet well 5 includes a generally cylindrical side wall 8 that extends upwardly from the bottom wall 6 to an open top end. If desired, the inlet well 5 may include a top wall attached to the top end of the side wall 8 that is rotatably sealed to the center pier 1, such that the inlet well 5 includes a substantially enclosed chamber. The side wall 8 is spaced apart from the side wall of the feed well 4. The bottom wall 6 of the inlet well 5 may include one or more bottom ports 7. A directional deflector 10 may be attached to the bottom wall 6 adjacent each bottom port 7, or directional deflectors 10 may be attached centered on each bottom port 7. The side wall 8 of the inlet well 5 may include one or more side wall ports 9. A directional deflector 11 may be attached to the side wall 8 adjacent each side wall port 9, or directional deflectors 11 may be attached centered on each side wall port 9.

Fluid influent flows through the influent pipe 17 into the chamber of the center pier 1. The fluid influent may include a liquid such as water and various solid and semi-solid materials. The influent flows through the center pier 1 and out the pier inlet ports 2 into the inlet well chamber formed within the side wall 8 and above the bottom wall 6 of the inlet well 5. As the influent exits the pier inlet ports 2, the flow of the influent may be directed by the pier port directional deflectors 3 to initiate rotation of the influent flow in a generally circular direction about the axis 20 within the inlet well 5. The influent fluid exits the inlet well 5 through the bottom wall ports 7 and the side wall ports 9. The flow through the bottom wall ports 7 is redirected by the deflectors 10 centered on bottom ports 7 such that the flows from a pair of adjacent bottom ports 7 are directed toward one another and impinge upon one another thereby dissipating energy. A flow of the influent within the inlet well 5 through adjacent pairs of side wall ports 9 is redirected by the deflectors 11 centered on side wall ports 9 to flow toward one another such that the flow from adjacent ports 9 impinges upon one another and thereby dissipates energy.

Figure 3:
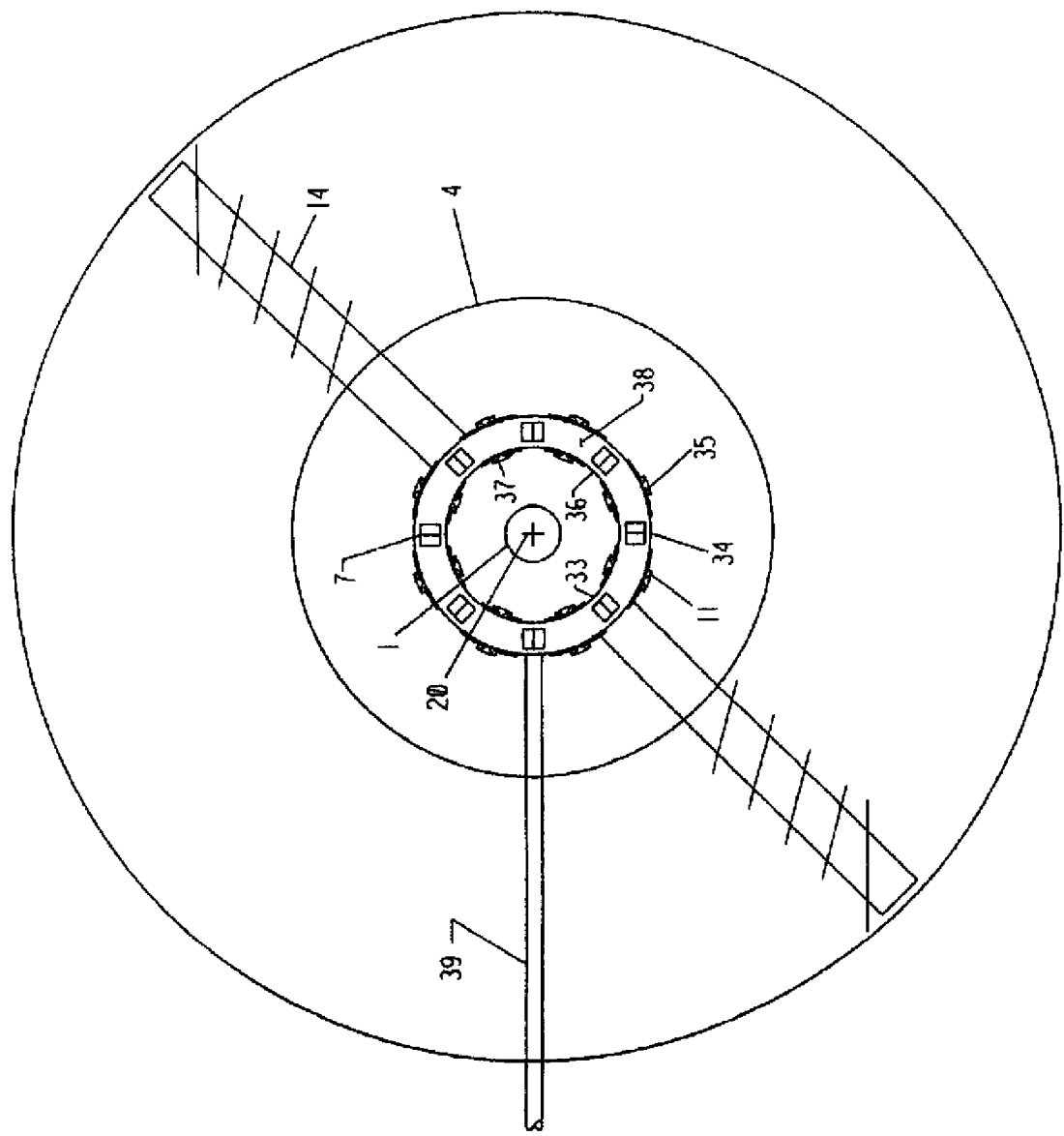
FIG. 3 is a plan view of a circular clarifier including an energy dissipating uniform flow distributing inlet of the current disclosure.
Figure 4:
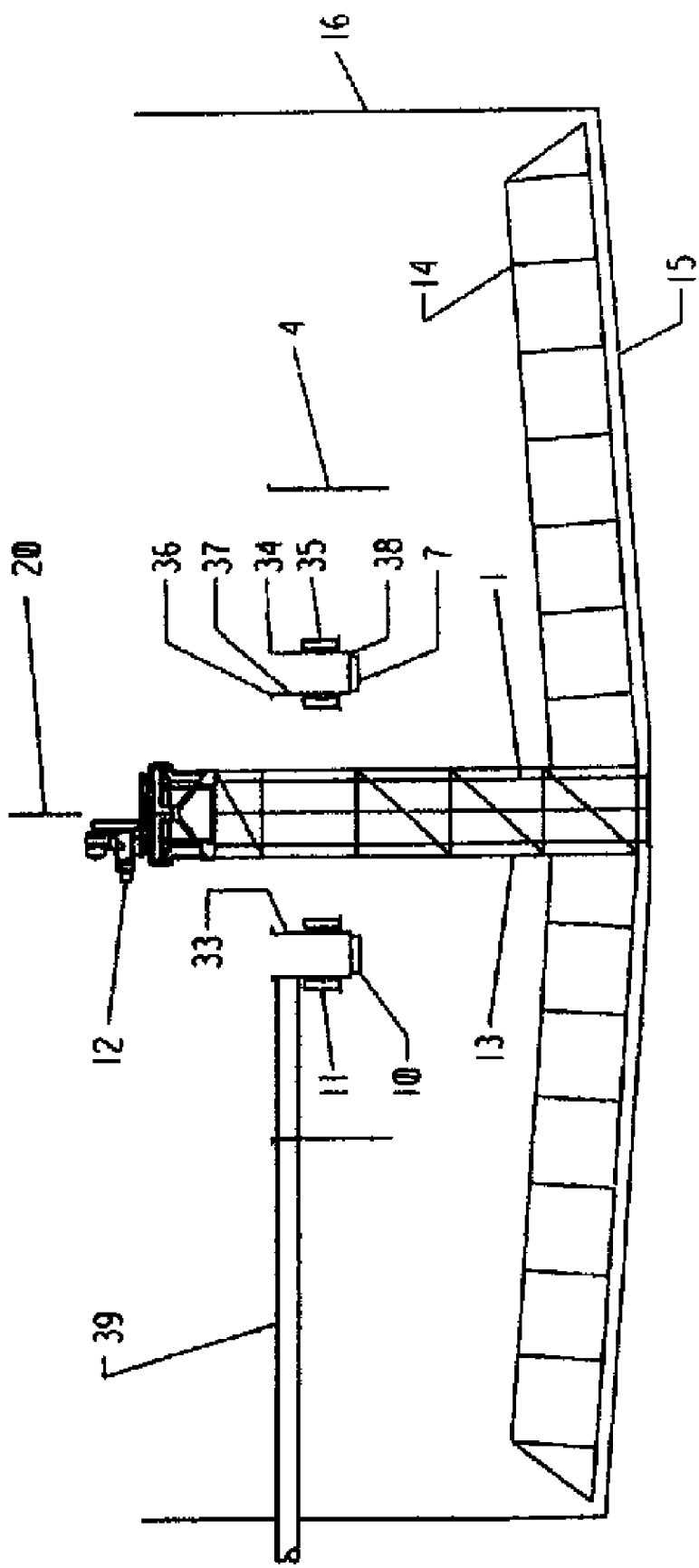
FIG. 4 is a partial cross-sectional elevation view of the clarifier of FIG. 3.

FIGS. 3 and 4 show a circular clarifier including a tank having a bottom wall 15 and side wall 16. The center pier 1 extends upwardly from the center of the bottom wall 15. The drive mechanism 12 rotatably couples the drive cage 13 and rake arms 14 to the center pier 1 for rotation about the axis 20. A generally circular feed well 4 extends around the center pier 1 and drive cage 13. An energy dissipating inlet, such as an inlet well in the form of an annular inlet trough 33 extends generally concentrically about the central axis 20, the center pier 1 and drive cage 13. The annular inlet trough 33 is located within and spaced apart from the feed well 4. The inlet trough 33 may be stationarily supported by the tank side wall 16, or rotatably by the drive cage 13. The inlet trough 33 includes a generally circular exterior wall 34 and a generally circular interior wall 36 located concentrically within and spaced apart from the exterior wall 34. A generally planar and annular bottom wall 38 extends between the bottom edges of the exterior and interior walls 34 and 36. A generally annular chamber is thereby formed between the interior and exterior side walls 36 and 34. A side influent pipe 39 is connected to the external wall 34 and is in fluid communication with the chamber of the inlet trough 33. Alternately, the influent pipe 39 may be detached from side wall 34 and in fluid communication with the chamber of the inlet trough 33 from above.

The exterior wall 34 may include a plurality of exterior side wall ports 35 generally equally spaced about the perimeter of the exterior wall 34. The interior wall 36 may include a plurality of interior side wall ports 37 located generally equidistantly about the perimeter of the internal wall 36. The bottom wall 38 of the trough 33 may include a plurality of bottom ports 7 generally equally spaced from one another about the axis 20. A directional deflector 11 may be attached to the side walls of the trough 33 adjacent each respective side wall port 35 and 37, or deflectors 11 may be centered on side wall ports 35 and 37. A bottom wall directional deflector 10 may be attached to the bottom wall 38 adjacent each bottom port 7, or deflectors 10 may be centered on the bottom ports 7.

Influent enters the tank through the side influent pipe 39 into the chamber of the annular trough 33. The influent exits the annular trough 33 through the bottom ports 7, exterior wall ports 35, and interior wall ports 37. The deflectors 11 are arranged to direct the flow through adjacent interior wall ports 37, and through adjacent exterior wall ports 35, to flow toward one another and impinge upon the flow from adjacent ports to thereby dissipate fluid flow energy. The influent flow through the bottom ports 7 is redirected by the deflectors 10 such that the flows through adjacent bottom ports 7 are redirected to flow toward one another and impinge on one another to also dissipate fluid flow energy.

Figure 5:
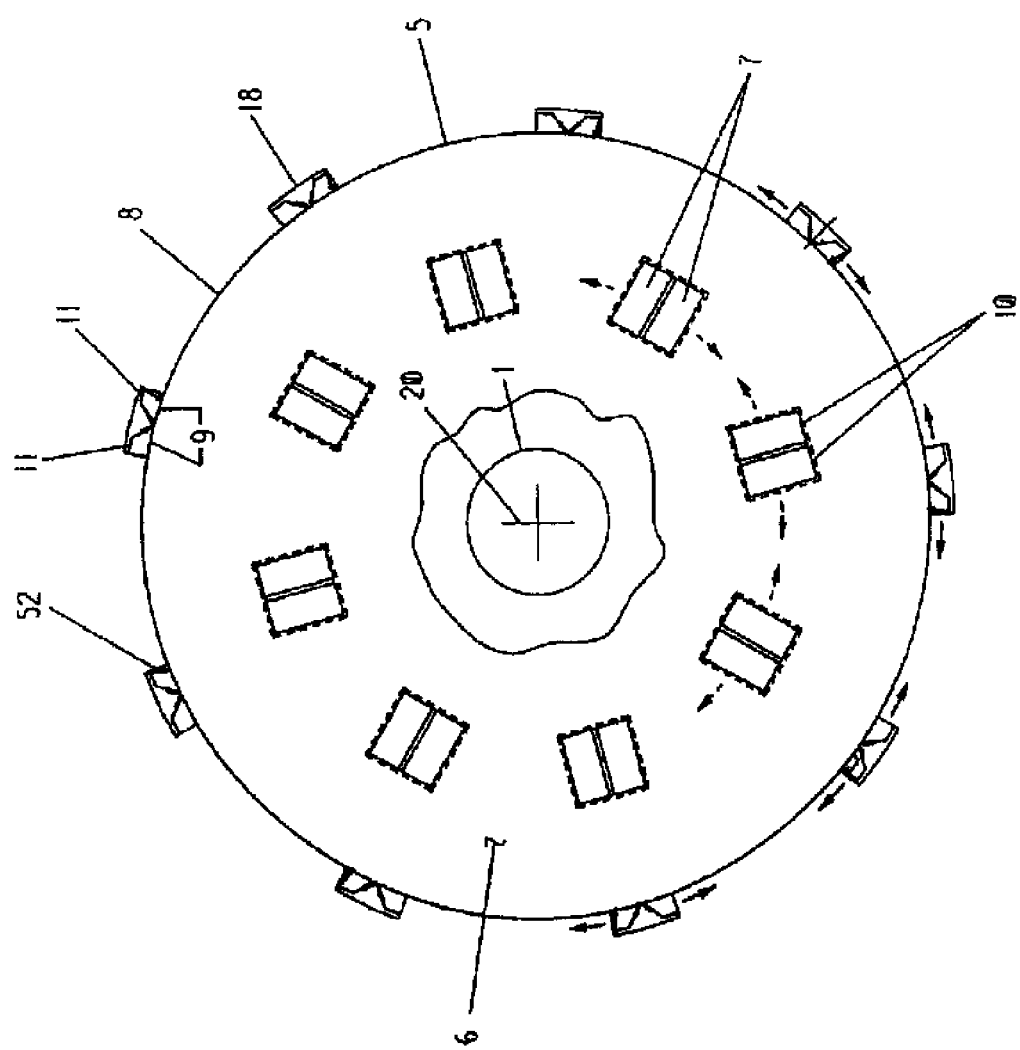
FIG. 5 is a plan cross-sectional view through the inlet well of FIG. 2.
Figure 6:
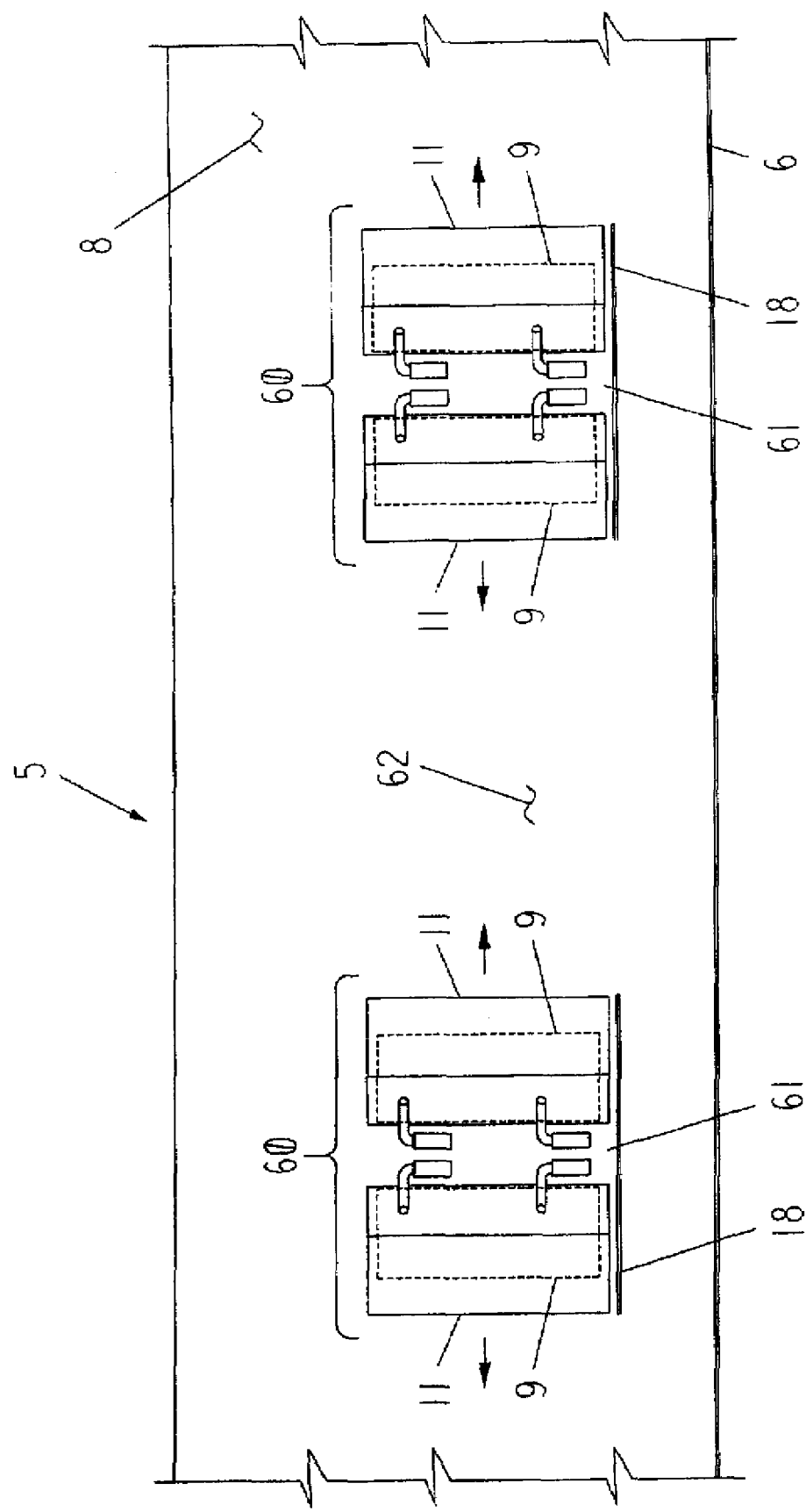
FIG. 6 is a partial side elevational view of two port clusters in the inlet well in FIGS. 2 and 5.

As shown in FIGS. 5 and 6, the sidewall 8 of the inlet well 5 may include a plurality of port clusters 60 that are generally equally spaced from one another about the central axis 20. Each port cluster 60 includes two or more adjacent side wall ports 9 that are separated by a ligature 61 of the side wall 8. The ligature 61 is relatively narrow such that the side wall ports 9 of each port cluster 60 are located generally closely adjacent to one another. The width of the ligature 61 is substantially narrower than the width of the separating wall portion 62 of the side wall 8 that extends between adjacent port clusters 60.

As shown in FIG. 6, a directional deflector 11 is associated with each side wall port 9 and is pivotally connected to the ligature 61 of the side wall 8 by a pivot member, such as a hinge. The directional deflectors 11 are thereby selectively pivotal with respect to the side wall 8 about a generally vertical axis. Each directional deflector 11 is retained in a selected deflecting position by an adjustment mechanism 52, which may be, for example, a chain, cable, threaded rod assembly or other similar mechanism. The adjustment mechanism 52 may be used to selectively pivot the directional deflector 11 with respect to the side wall 8. Each directional deflector member 11 includes a generally planar first leg having a first edge pivotally attached to the side wall 8 and a generally planar second leg that is attached to an opposite second edge of the first leg. The second leg is disposed at an angle to the first leg, such as for example, at an angle of approximately forty-five degrees. Other angles may be used as desired.

As shown in FIG. 6, each directional deflector 11 in a port cluster 60 is adapted to direct influent flow from the side wall ports 9 in substantially opposite directions relative to one another, although not necessarily exactly 180 degrees from one another. As shown in FIG. 6, the right directional deflector 11 in the left port cluster port 60 will direct influent flow toward the influent flow directed by the left directional deflector 11 of the right port cluster 60, such that the respective fluid flows are toward one another and impinge upon one another dissipating energy. Each port cluster 60 may also include a generally horizontal bottom baffle 18, such as a generally horizontal plate, that is attached to and extends generally horizontally outwardly from the side wall 8 below the ports 9. The horizontal baffles 18 substantially prevent the flow of influent through the side wall ports 9 from flowing downwardly as the influent exits the side wall ports 9. The horizontal baffles 18 extend the width of the side wall ports in each port cluster 60 and outwardly beyond the ports.

As shown in FIGS. 7 and 8, the bottom wall 6 of the inlet well 5 may include a plurality of port clusters 80. Each port cluster 80 includes two or more bottom ports 7 that are located closely adjacent to one another and that are separated by a ligature 81. The ligature 81 is substantially narrower than the bottom wall separating portion 82 of the bottom wall 6 that is located between adjacent port clusters 80. A directional deflector 10 is associated with each bottom port 7 and is pivotally attached to a ligature 81 for pivotal movement about a generally horizontal axis by a pivot member, such as a hinge. Each directional deflector 10 may be held in a selected position by an adjustment mechanism 71. The adjustment mechanism 71 may also be used to selectively pivot the directional deflector 10 with respect to the bottom wall 6 to a desired position. The directional deflectors 10 are constructed substantially similar to the directional deflectors 11. The influent exiting through the bottom port 7 of a port cluster 80 is redirected by the directional deflector 10 in a direction generally toward an influent flow that has been redirected by a directional deflector 10 of an adjacent port cluster 80, such that the respective influent flows are directed toward one another and impinge upon one another. The redirected flow of the influent is substantially horizontal and parallel to the bottom wall 6 of the inlet wall 5 as it leaves the directional deflectors 10.

As shown in FIGS. 9-12, the interior side wall 36 of the annular inlet trough 33 may include a plurality of interior port clusters 94 uniformly spaced apart from one another about the axis 20. Each interior port cluster 94 includes two or more interior side wall ports 37 that are located closely adjacent to one another and that are separated by a relatively narrow ligature 110. The ligature 110 is substantially narrower than the side wall separating portions 111 that are located between each adjacent interior port cluster 94. A directional deflector 11 is associated with each side wall port 37 and is pivotally attached to a ligature 110. The directional deflectors 11 of each interior port cluster 94 are adapted to redirect the flow of influent from the side wall ports 37 in substantially opposite directions relative to one another. A generally horizontal baffle 95, such as a generally planar plate, is attached to and extends generally horizontally outwardly from the interior side wall 36 beneath the side wall ports 37 of each interior port cluster 94. The horizontal baffle 95 is adapted to prevent downward flow of the influent as it exits through the side wall ports 37.

The exterior side wall 34 of the annular inlet trough 33 may include a plurality of exterior port clusters 91 that are generally equally spaced from one another about the central axis 20. Each exterior port cluster 91 includes two or more external side wall ports 35 that are located closely adjacent to one another and that are separated by a ligature 120. The ligature 120 is substantially narrower than the side wall separating portion 121 of the exterior side wall 34 that separates adjacent exterior port clusters 91. A directional deflector 11 is associated with each external wall port 35 and is pivotally attached to the ligature 120 for selective pivotal movement about a generally vertical pivotal axis. Each directional deflector 11 is selectively positioned and held in a selected position by an adjustment mechanism. The directional deflectors 11 of each exterior port cluster 91 are adapted to redirect the flow of influent exiting through the external wall ports 35 in generally opposite directions relative to one another. The influent flows from each exterior port cluster 91 are thereby directed toward the influent flow from adjacent exterior port clusters 91 in a direction toward one another such that flows impinge upon one another and dissipate energy. Each exterior port cluster 91 may include a horizontal baffle 93, such as a generally planar plate, that is located beneath the exterior wall ports 35 of the exterior port cluster 91. The horizontal baffle 93 is adapted to prevent downward flow of the influent as it exits through the external wall ports 35. The exterior wall port clusters 91 are constructed substantially similar to the interior wall port clusters 94.

Figure 9:
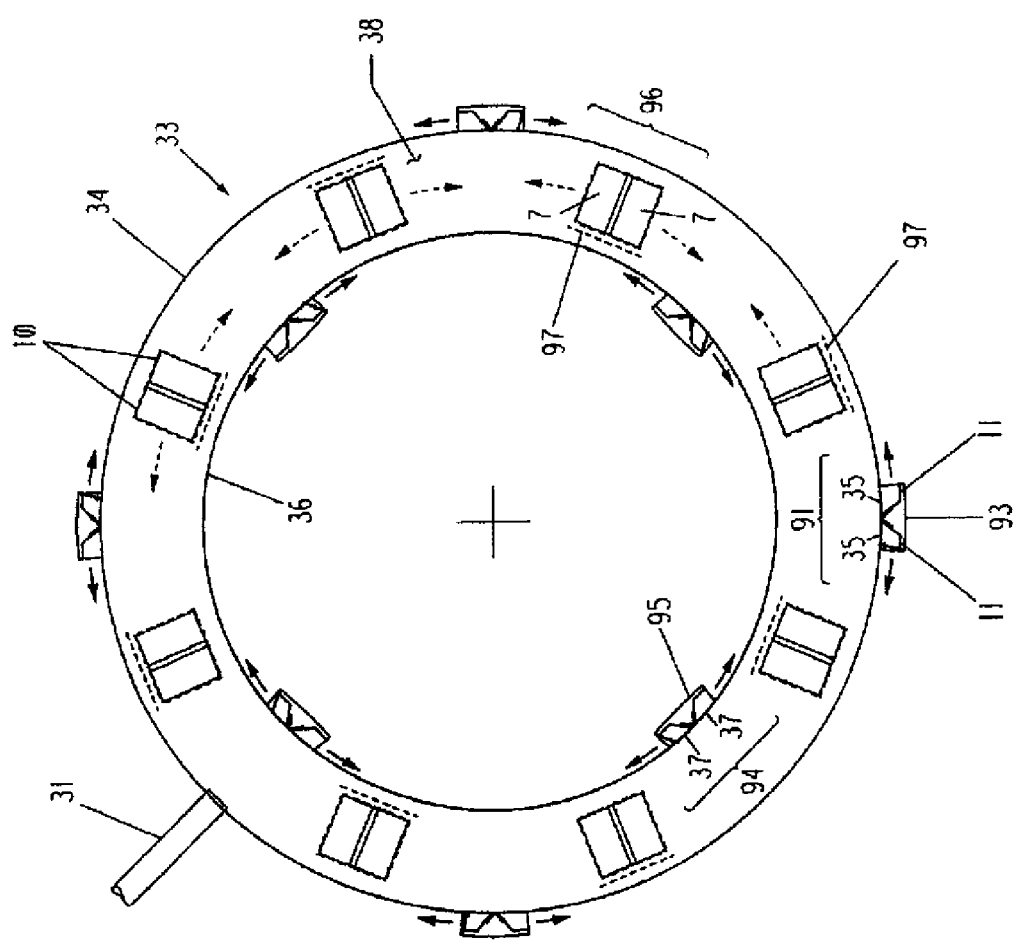
FIG. 9 is a cross-sectional plan view through the inlet trough of FIGS. 3 and 4.
Figure 11:
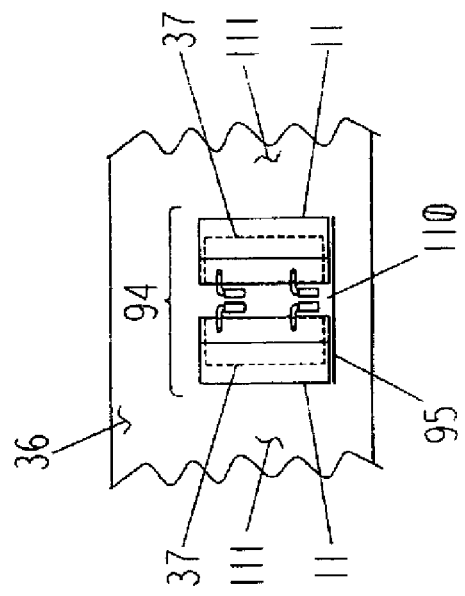
FIG. 11 is a side elevational view of the exterior wall ports and directional deflectors of FIG. 10.
Figure 10:
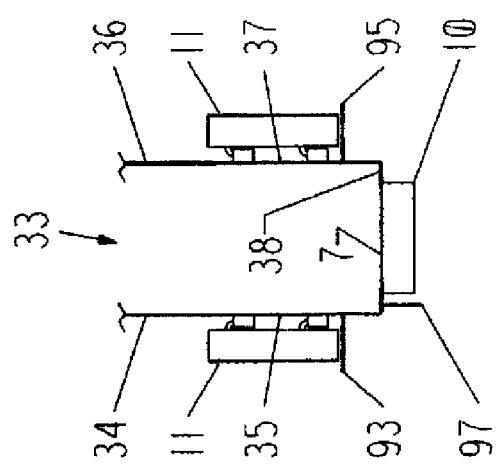
FIG. 10 is a vertical cross-sectional view through the annular trough of FIGS. 3 and 4.
Figure 12:
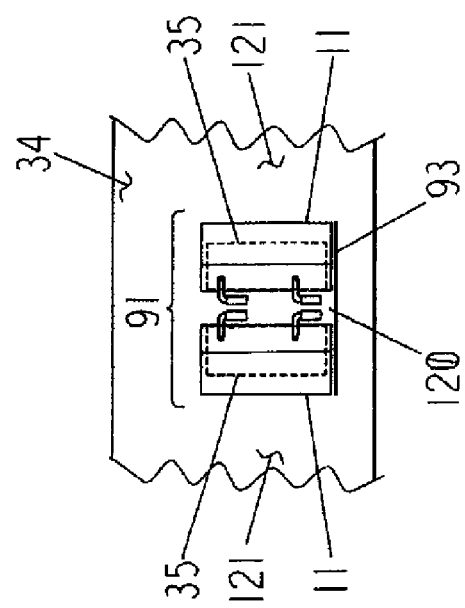
FIG. 12 is a side elevational view of the interior wall ports and directional deflectors of FIG. 10.
Figure 13:
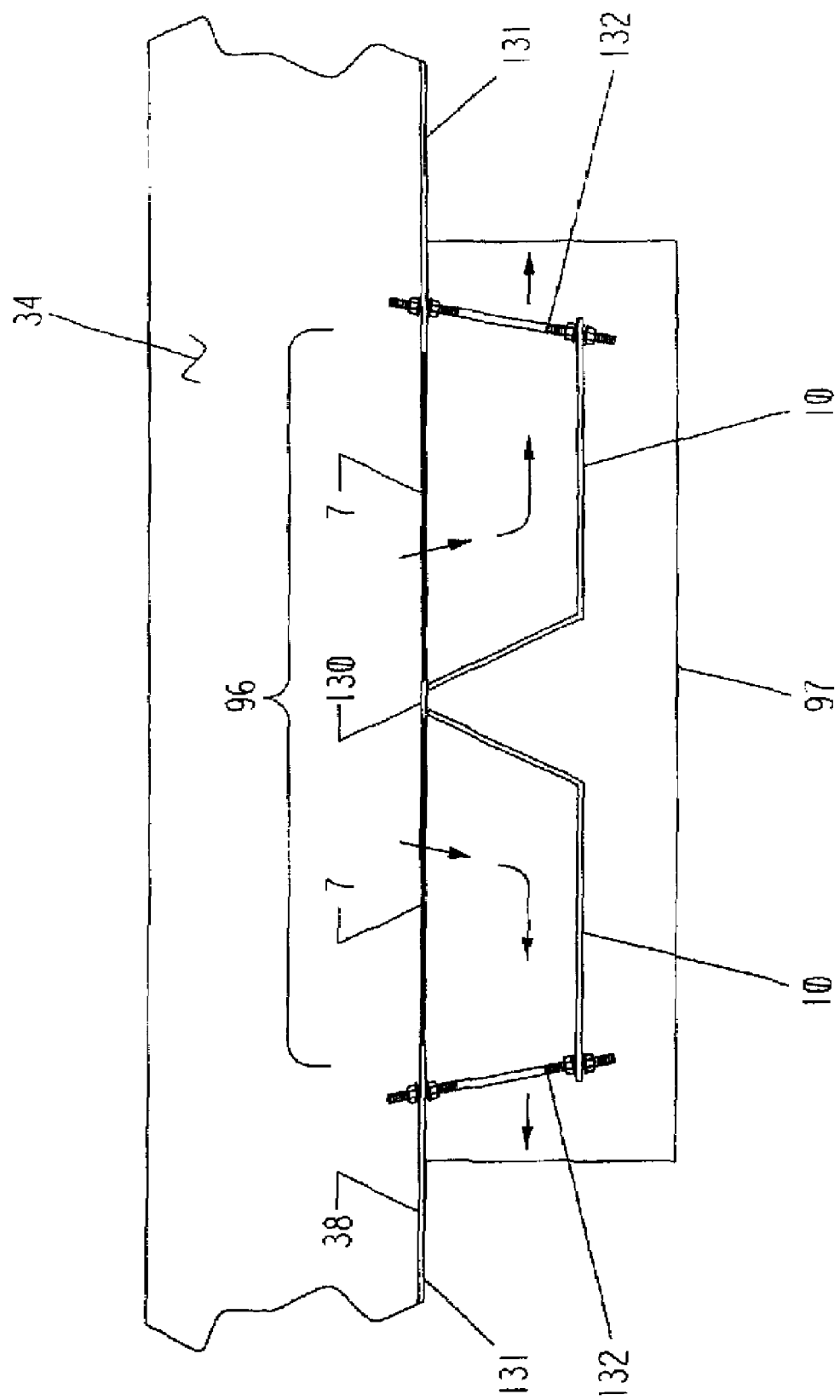
FIG. 13 is a side elevational view of the bottom ports and directional deflectors of FIG. 10.

The annular inlet trough 33 may also include a plurality of bottom port clusters 96 as shown in FIGS. 9, 10 and 13 which are generally equally spaced apart from one another about the axis 20. Each bottom port cluster 96 includes two or more bottom ports 7 that are located closely adjacent to one another and that are separated by a relatively narrow ligature 130. The ligature 130 is substantially narrower than the separating wall portion 131 of the bottom wall 138 that extends between adjacent bottom port clusters 96. A bottom directional deflector 10 is associated with each bottom port 7 and is pivotally connected to the ligature 130 by a pivot member, such as a hinge. An adjustment mechanism 132 selectively pivots the directional deflector 10 about a substantially horizontal axis with respect to the bottom wall 38 and retains the directional deflector 10 in a desired position. The directional deflectors 10 of each bottom port cluster 96 are adapted to redirect the flow of influent from the bottom ports 7 in substantially opposite directions relative to one another. Each bottom port cluster 96 may include an interior vertical baffle 97, such as a generally planar plate, that extends generally vertically downwardly from the bottom wall 38 and that is located adjacent the bottom ports 7, and between the bottom ports 7 and the internal side wall 36. The internal vertical baffle 97 is adapted to prevent radial flow of influent exiting from the bottom ports 7 in a direction generally toward the central axis 20. If desired, the bottom port cluster 96 may also include an external vertical baffle 97 that extends downwardly from the bottom wall 38 adjacent the bottom port 7, and that is located between the bottom ports 7 and the external side wall 34. The external vertical baffle 97 is adapted to prevent flow of influent exiting the bottom ports 7 from flowing radially outwardly in a direction away from the central axis 20.

Figure 14:
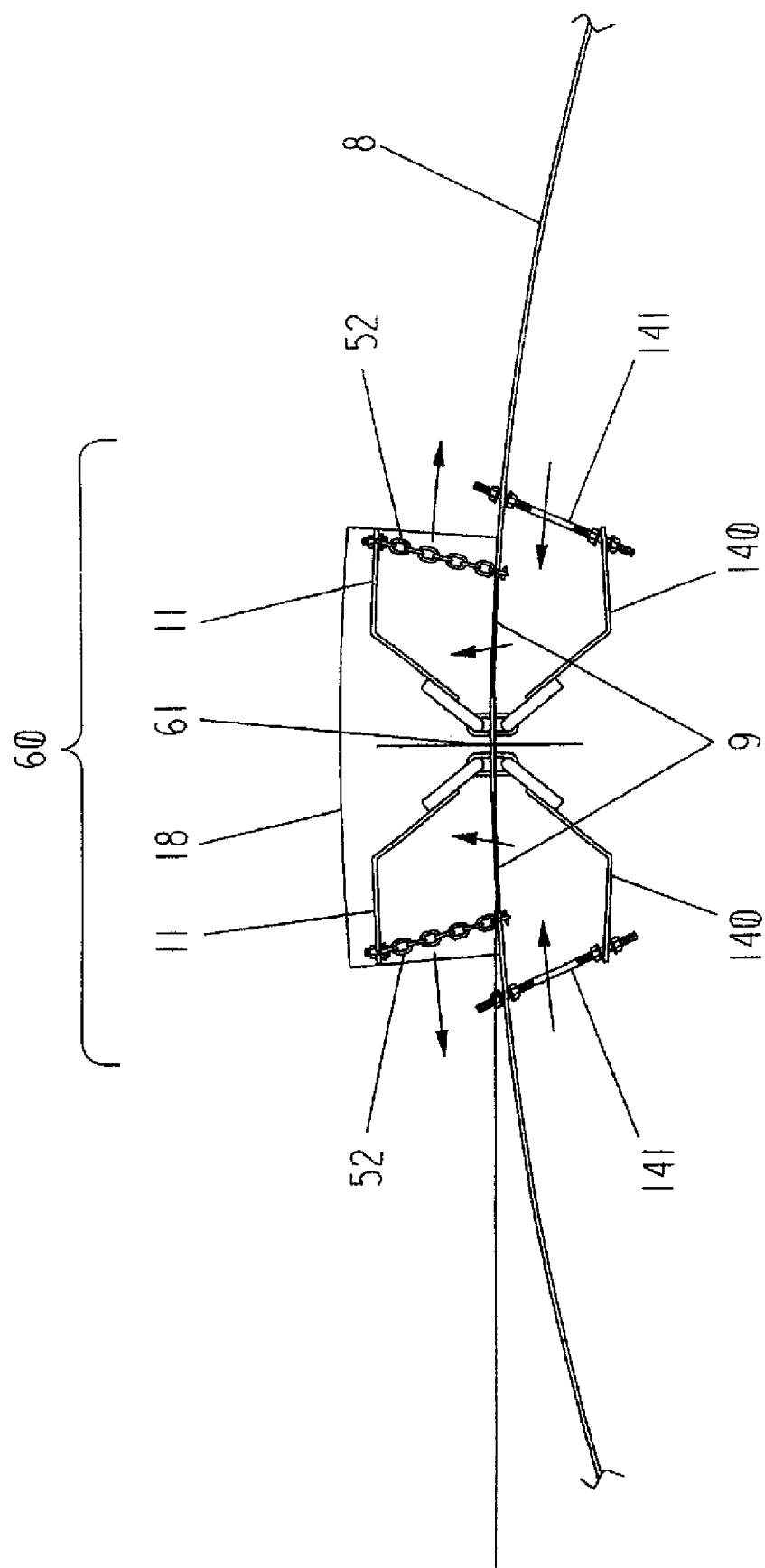
FIG. 14 shows ports in a well side wall with flow redirecting baffles located inside the well for redirecting flow to the port and for redirecting flow to redirecting deflectors located outside the well.
Figure 15:
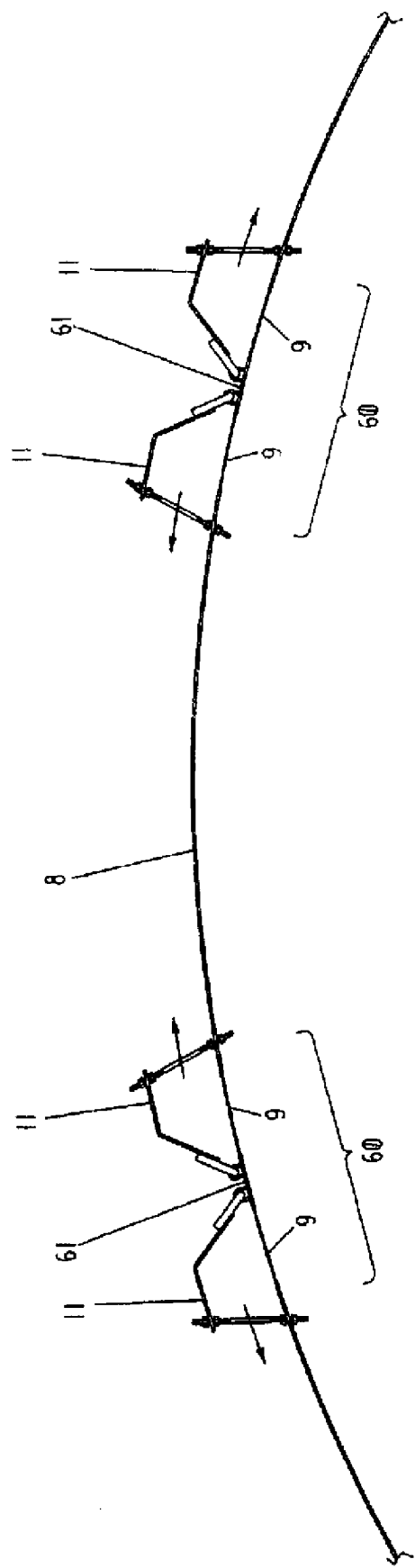
FIG. 15 shows two port clusters and the ligature span between ports and the greater span of wall between port clusters.

As shown in FIG. 14, an internal side wall baffle 140, which is constructed substantially similar to the directional deflectors 11, may be used in association with each side wall port 9 on the internal side of the inlet well side wall 8. The side wall baffles 140 are pivotally connected to the ligature 61 and are adjustably positioned with respect to the inlet side wall 8 with an adjustment mechanism 141. The internal side wall baffles 140 may be used to redirect influent flow from the center pier ports 2 to the inlet well side wall ports 9.

Figure 16:
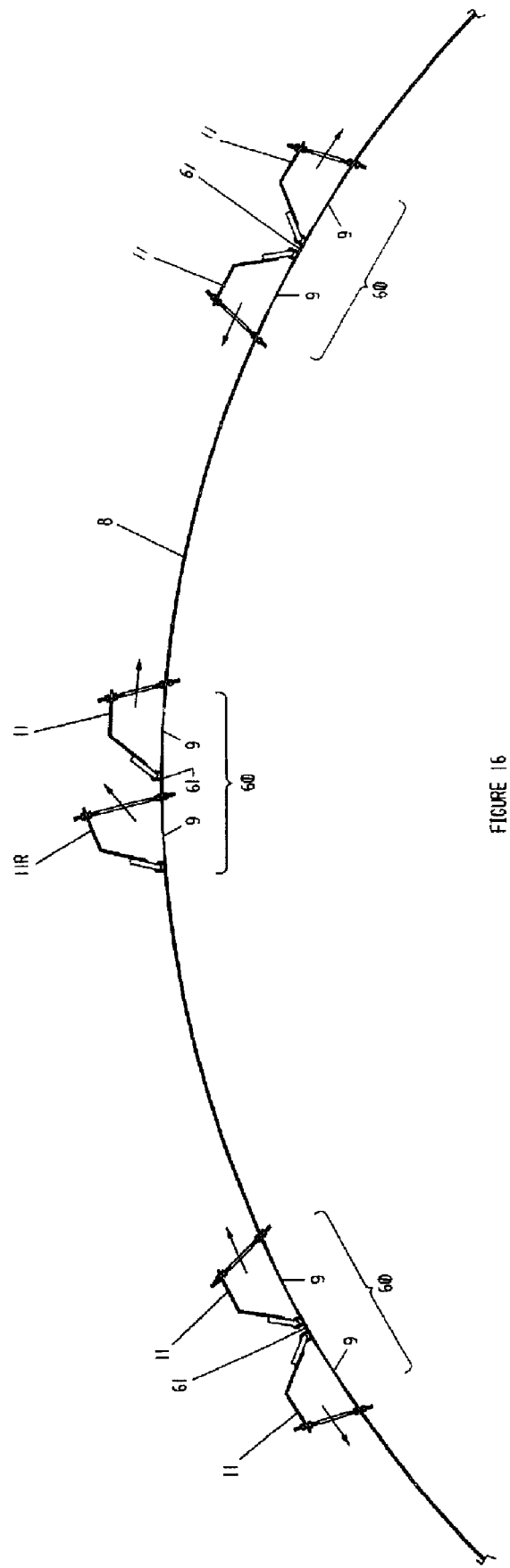
FIG. 16 shows both impinging and rotational deflectors attached to the side wall or ligature in a well wall.

FIG. 16 shows three side wall port clusters 60, with the left and right port clusters 60 including two directional deflectors 11 that redirect influent flow in generally opposite directions relative to one another. In the center port cluster 60, a flow deflector 11 is provided in connection with the right side wall port 9 that provides fluid flow in a direction adapted to impinge with fluid flow from the left directional deflector 11 of the right port cluster 60. The center port cluster 60 also includes a directional deflector 11R that is pivotally attached to the separating wall portion 62 of the side wall 8 and that is adapted to redirect flow from the left port 9 in a direction away from the left port cluster 60 to provide a generally clockwise rotational flow of influent about the central axis 20. The right directional deflector 11 of the left port cluster 60 is thereby also adapted to provide rotational flow about the central axis 20 in a generally clockwise direction as flow therefrom does not impinge the flow from any other port clusters 60.

Figure 17:
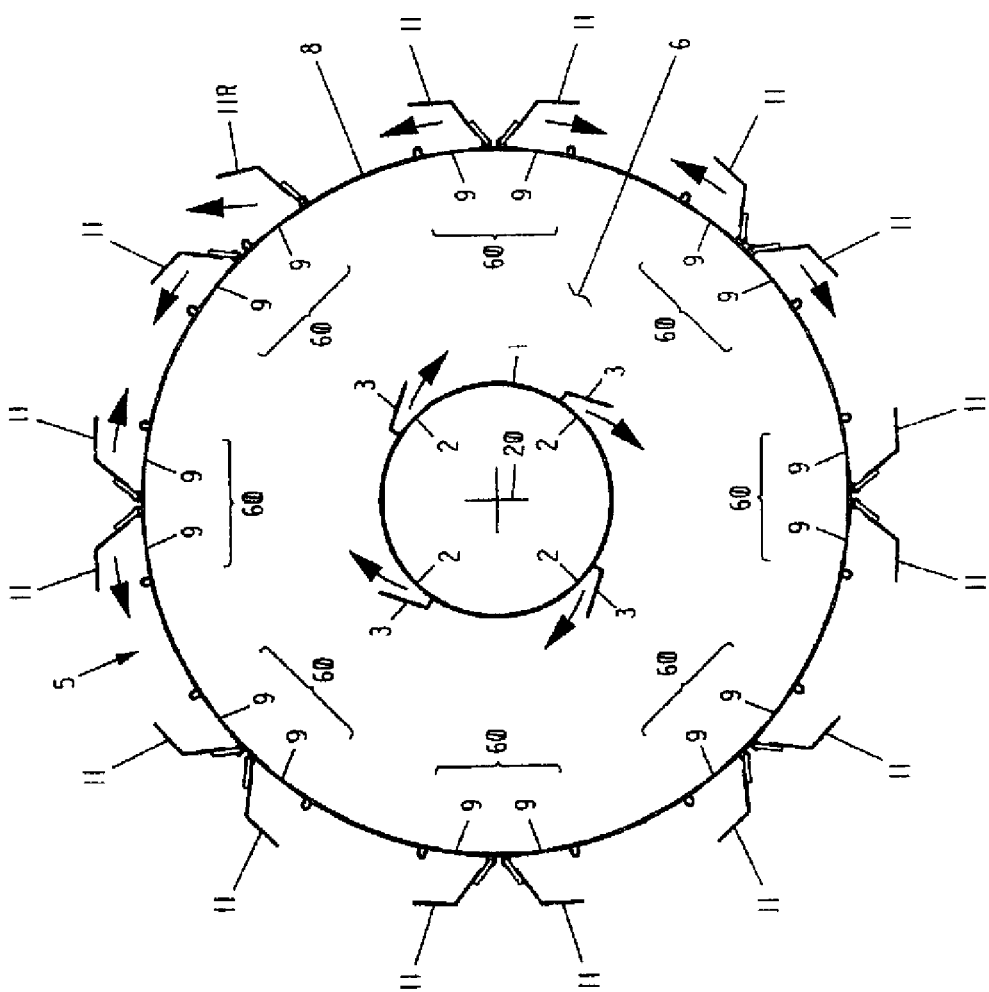
FIG. 17 shows both impinging and rotational deflectors at the ports of a well side wall.

As shown in FIG. 17, the pier port directional baffles 3 initiate a generally clockwise rotational flow of influent about the central axis 20 as the influent flows through the center pier ports 2. Influent fluid exits the inlet well 5 through the side wall ports 9 located in the side wall 8. The flow through the side wall ports 9 is directed by the directional deflectors 11 to flow in directions that impinge upon the flow from adjacent ports 9, with the exception of the directional deflector 11R that is adapted to provide rotational flow in a generally counter-clockwise direction about the axis 20. The directional deflector 11 most closely adjacent to the deflector 11R in the adjacent port cluster 60 also provides rotational flow in the generally counter-clockwise direction about the central axis 20 due to the absence of any impinging flow from the deflector 11R. Consequently, a generally counter-clockwise flow is provided by the arrangement in FIG. 17 as influent exits through the side wall ports 9.

FIGS. 18-20 show a triple port cluster 181 including three or more bottom ports and a bottom wall 180 of an inlet well 5. As shown in FIGS. 18-20, the triple port cluster 181 includes bottom ports 182, 183 and 184. Directional deflectors 10 are associated with each bottom port. As shown in FIG. 18, the directional deflectors 10 associated with the bottom ports 182 and 183 are adapted to direct influent flow in generally opposite directions relative to one another and generally perpendicular to the central axis 20. The directional baffle 10 associated with the bottom port 184 is adapted to direct influent flow in a direction generally perpendicular to the flow from the bottom ports 182 and 183 and generally radially outwardly from the central axis 20. If desired, one of the directional baffles 10 associated with either the bottom port 182 or 183 could be reversed such that the flow from both bottom ports 182 and 183 are directed in the same direction in a non-impinging manner to provide rotational flow about the central axis 20.

Figure 21:
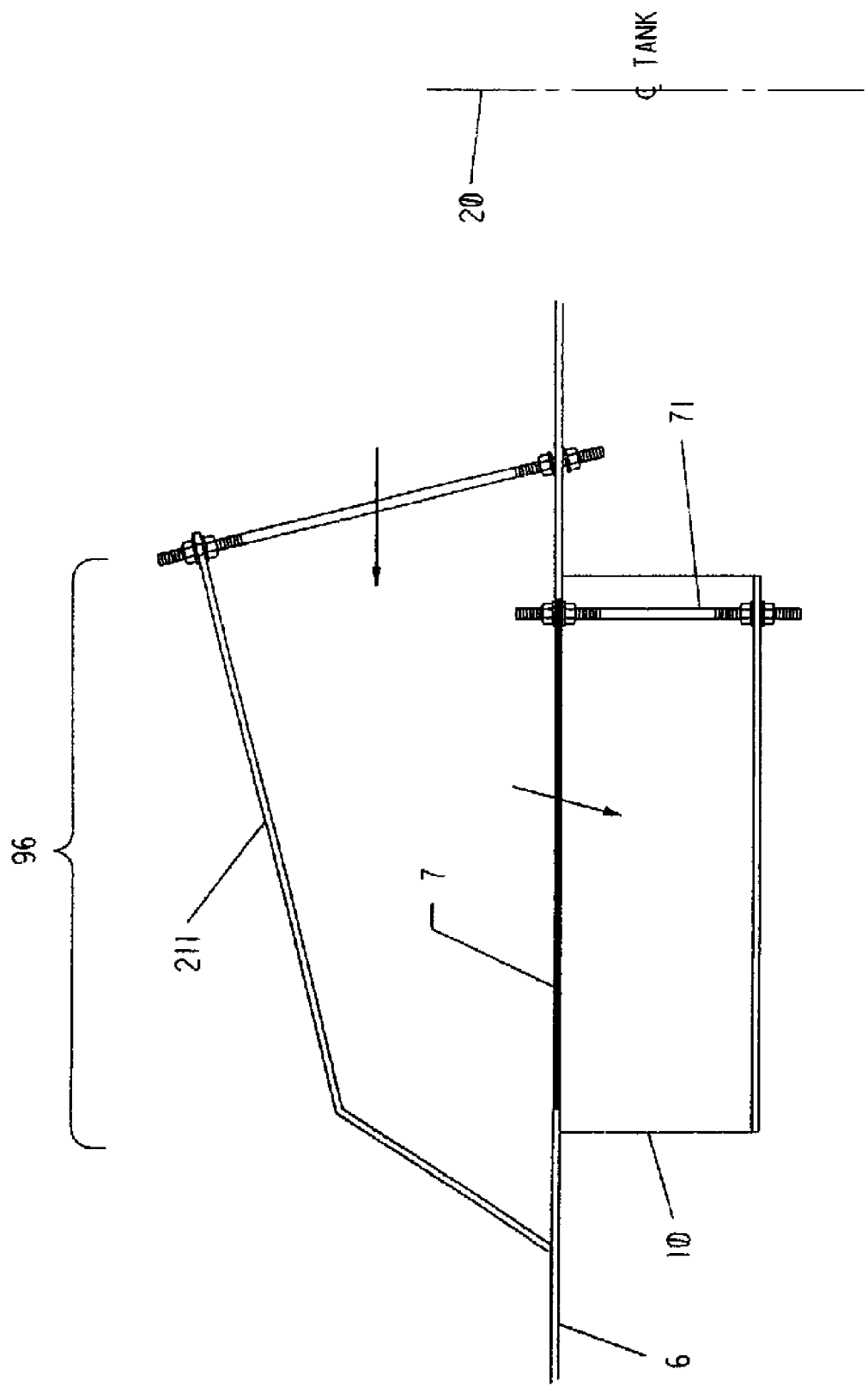
FIG. 21 shows a bottom port with an exterior flow redirecting deflector and an interior flow redirecting baffle.

FIG. 21 shows a bottom port cluster 96 with an internal directional baffle 211 attached to the interior surface of the bottom wall 6. The baffle 211 redirects flow within the inlet well 5 to the bottom wall port 7 of the bottom port cluster 96. If desired, the directional baffle 211 may be oriented away from the central axis 20.

Figure 22:
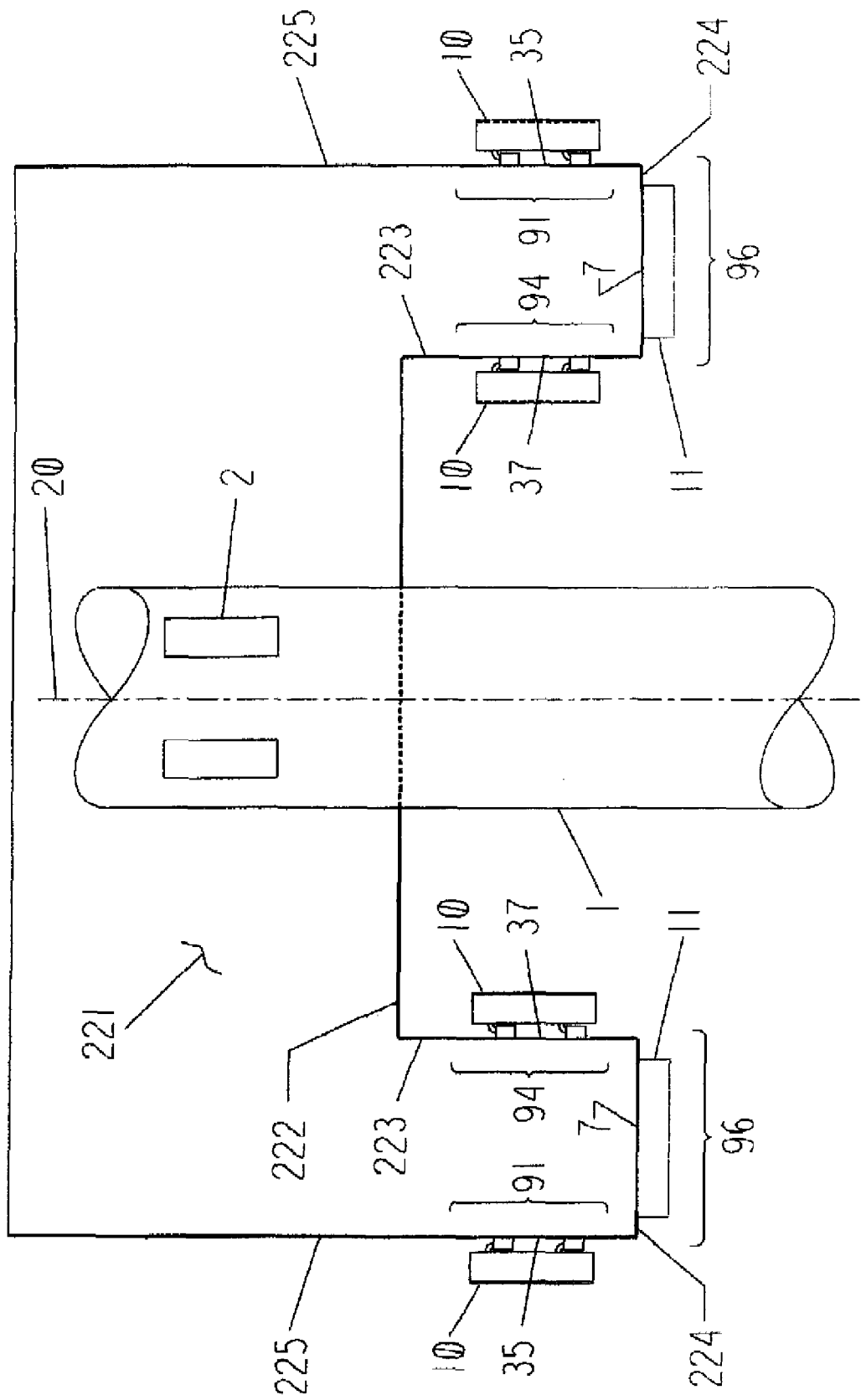
FIG. 22 shows a modified embodiment of an inlet well.

FIG. 22 shows an energy dissipating inlet in the form of an inlet well 221 that combines the configuration of the inlet well 5 and the annular inlet trough 33. The inlet well 221 includes a generally cylindrical external side wall 225 and a generally cylindrical internal side wall 223 concentrically located within the external side wall 225. A generally annular external bottom wall 224 extends between the bottom edges of the internal side wall 223 and external side wall 225 forming a generally trough configuration. A generally horizontal internal bottom wall 222 extends between the top edge of the internal side wall 223 and the center pier 1. The external side wall 225 includes a top edge that is located above the top edge of the internal side wall 223 and above the internal bottom wall 222. One or more internal port clusters 94 are located in the internal side wall 223 and one or more external port clusters 91 are located in the external side wall 225. One or more bottom port clusters 96 are located in the external bottom wall 224. The influent flows from the port clusters 94 can be set to impinge flows from adjacent port clusters 94 to provide fluid flow energy dissipation, or they may be set to combine with flow from adjacent port clusters 94 to establish rotational flow about the central axis 20. The flows from the port clusters 91 can similarly be set to provide impinging flows or rotational flows. Similarly, the bottom port clusters 96 can be set to provide impinging flows or rotational flows. Rotational flows provided by each of the port clusters 91, 94 and 96 may be set to provide rotational flows in the same direction relative to one another, or in different rotational directions with respect to flows from one or more of the other port clusters.

Figure 23:
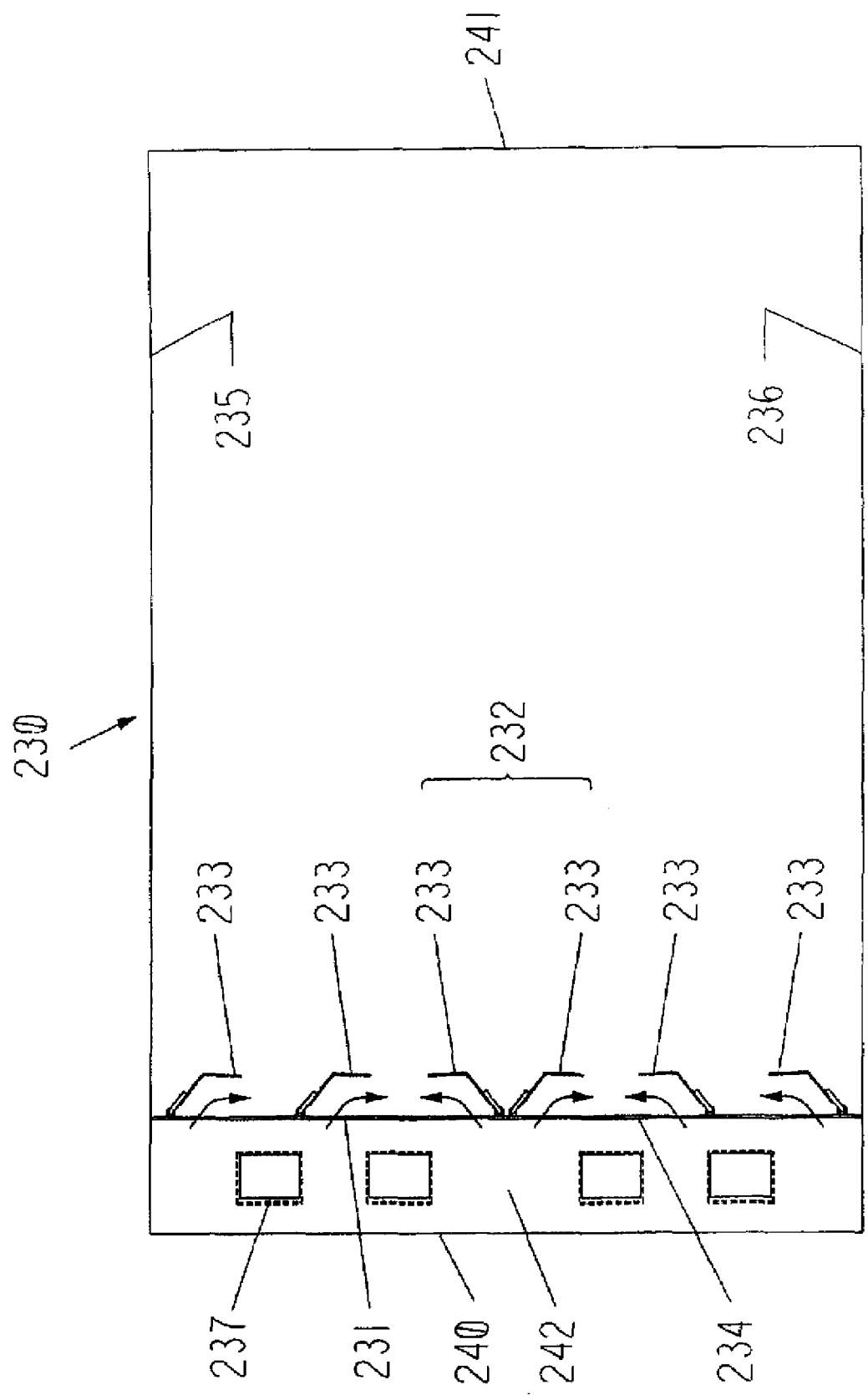
FIG. 23 is a plan view of a rectangular collector including balanced impinging deflectors and non-impinging deflectors near the tank wall.
Figure 24:
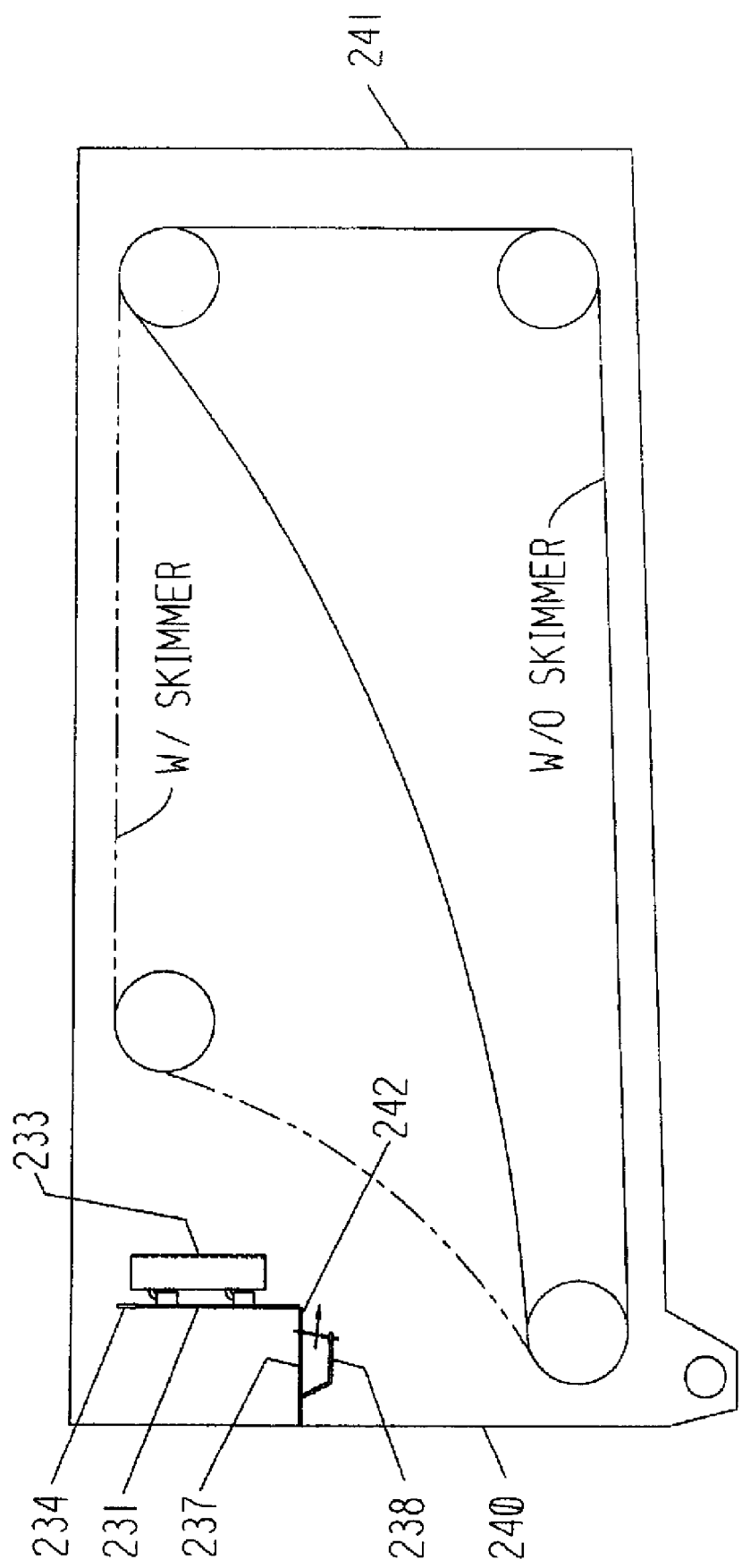
FIG. 24 is a side elevational section of the tank in FIG. 23.
Figure 26:
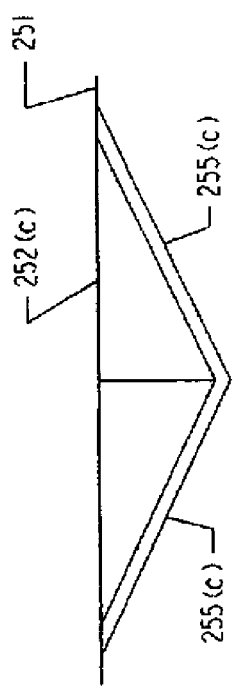
FIG. 26 is a front elevational view of a directional deflector of FIG. 25.
Figure 27:
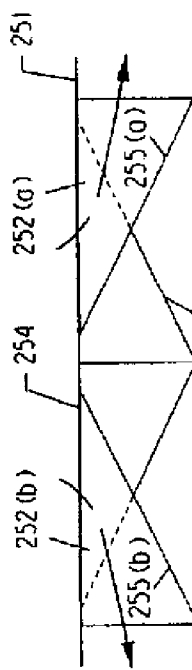
FIG. 27 is a rear elevational view of a directional deflector of FIG. 25 from a position of roughly 180° from that of FIG. 26.

A rectangular collector 230 is shown in FIGS. 23 and 24. The rectangular collector 230 includes a tank having opposing generally parallel side walls 235 and 236, and opposing generally parallel end walls 240 and 241. The collector 230 includes an energy dissipating inlet comprising an inlet well that extends generally horizontally and linearly along the end wall 240. The inlet well includes a generally planar and vertical side wall 234 and a generally planar and horizontal bottom wall 242. The side wall 234 includes a plurality of side wall ports 241 and the bottom wall 242 includes a plurality of bottom ports 237. A directional deflector 233 is associated with each side wall port 231. The deflectors 233 are constructed and operate generally similarly to the directional deflectors 11. The directional deflectors 233 are pivotal with respect to the side wall 234 to a desired position. The side wall 234 may include one or more port clusters 232 that include two or more side wall ports 231 and their respective directional deflectors 233. The directional deflectors 233 of a port cluster 232 may be adapted to direct fluid flow from their respective side wall ports 231 in substantially opposite directions relative to one another to thereby impinge with the flow from adjacent side wall ports 231.

As shown in FIG. 23, the four center directional deflectors 233 are set to provide two sets of impinging flows. The two outer-most directional deflectors 233 are set to direct flow from their respective side wall ports 231 toward the center of the tank and away from the respective side walls 235 and 236. Fluid thereby flows toward the center of the tank rather than along the side walls 235 and 236.

A bottom directional deflector 238 is associated with each bottom port 237. The directional deflectors 238 may be set to provide impinging flow with respect to flows from adjacent directional deflectors 238, to deflect flow from the side walls 235 and 236, or to direct flow generally parallel to the longitudinal axis of the tank toward the end wall 241.

Figure 25:
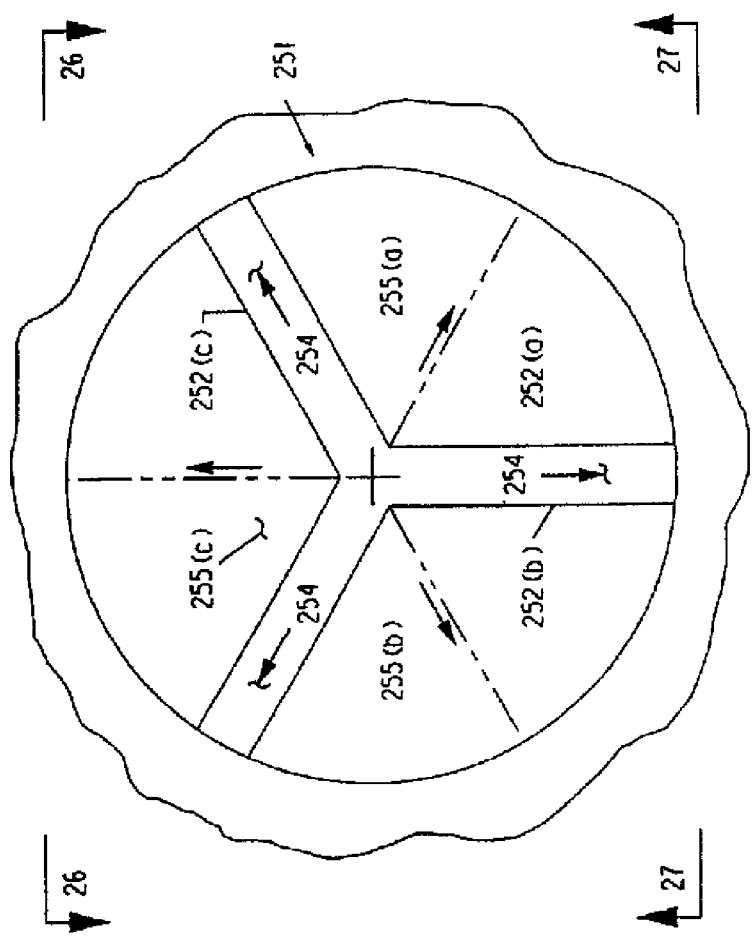
FIG. 25 is a plan view of a triple port cluster.

FIGS. 25-28 show a triple port cluster 253 located in the bottom wall 251 of an inlet well. The port cluster includes three or more ports 252, respectively identified as ports 252A-C. Each port 252 is formed in the general arrangement of a segment of a circle. Adjacent ports 252 are separated from one another by a respective ligature 254. As shown in FIG. 25 the ligatures 254 are formed in a generally Y-shaped arrangement and are equally spaced about a central axis. The ports 252 may be configured in other shapes as desired. Each of the ports 252A-C may have the same or different cross-sectional areas to thereby control flow through the respective ports. A directional deflector 255 is associated with each port 252, and are identified with the reference numbers 255A-C. Each deflector 255 is formed generally as a portion of a funnel in the general shape of a folded or curved circular segment. Each deflector 255 includes two generally linear side edges that are attached to the bottom wall 251 and that diverge outwardly away from one another such than an opening is formed at the outer end of the deflector 255. The deflectors 255 are attached to the ligatures 254 of the bottom wall 251. The ports 252 and deflectors 255 divide the flow through the triple port cluster 253 into three flow streams. As shown in FIG. 25, the flow streams are generally radially outwardly from the central axis of the triple port cluster 253 and are generally equally spaced about its central axis. A plurality of triple port clusters 253 may be located in the bottom wall 251, such that the flows provided by these clusters are impinging and also radial with respect to the center axis 20. For example, the directional deflector 255C may direct flow in a substantially radial direction relative to the central axis 20. The directional deflectors 255A and 255B may redirect flow as two impinging flow streams with flows from the ports of adjacent triple port clusters.

Figure 29:
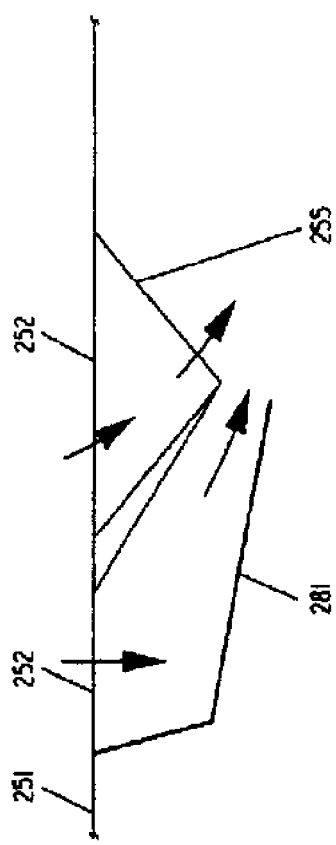
FIG. 29 is a side elevational view of the port cluster of FIG. 28.
Figure 30:
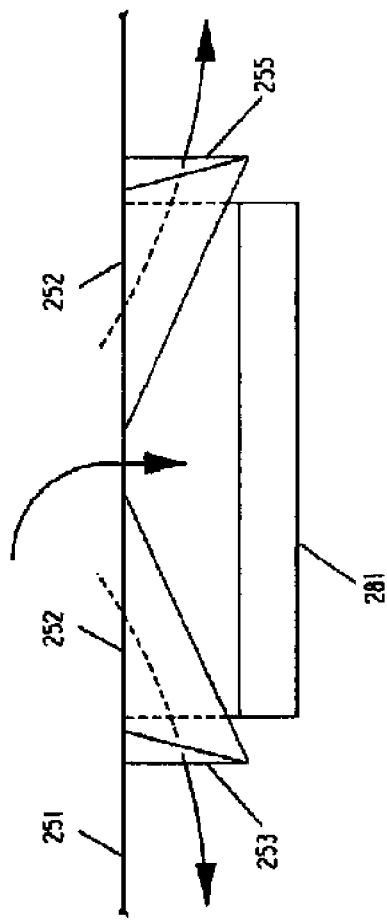
FIG. 30 is a front elevational view of the port cluster of FIG. 28.

FIGS. 28-30 show a triple port cluster 253 formed in the bottom wall 251 as in FIG. 25 that includes two funnel-shaped deflectors 255 respectively associated with two of the ports 252. A directional deflector 281 is associated with the third port 252. The deflector 281 is attached to the bottom surface of the bottom wall 251. The deflector 281 includes a first generally planar leg and a second generally planar leg attached to the first leg at an angle as shown in FIG. 29. The flows through the ports 252 with the associated deflectors 255 may impinge the flows from adjacent ports of adjacent triple port clusters 253. The flow from the port 252 and the directional deflector 281 may be directed radially inwardly toward the central axis 20, or radially outwardly away from the central axis 20 depending upon the orientation of the triple port cluster 253.

Figure 31:
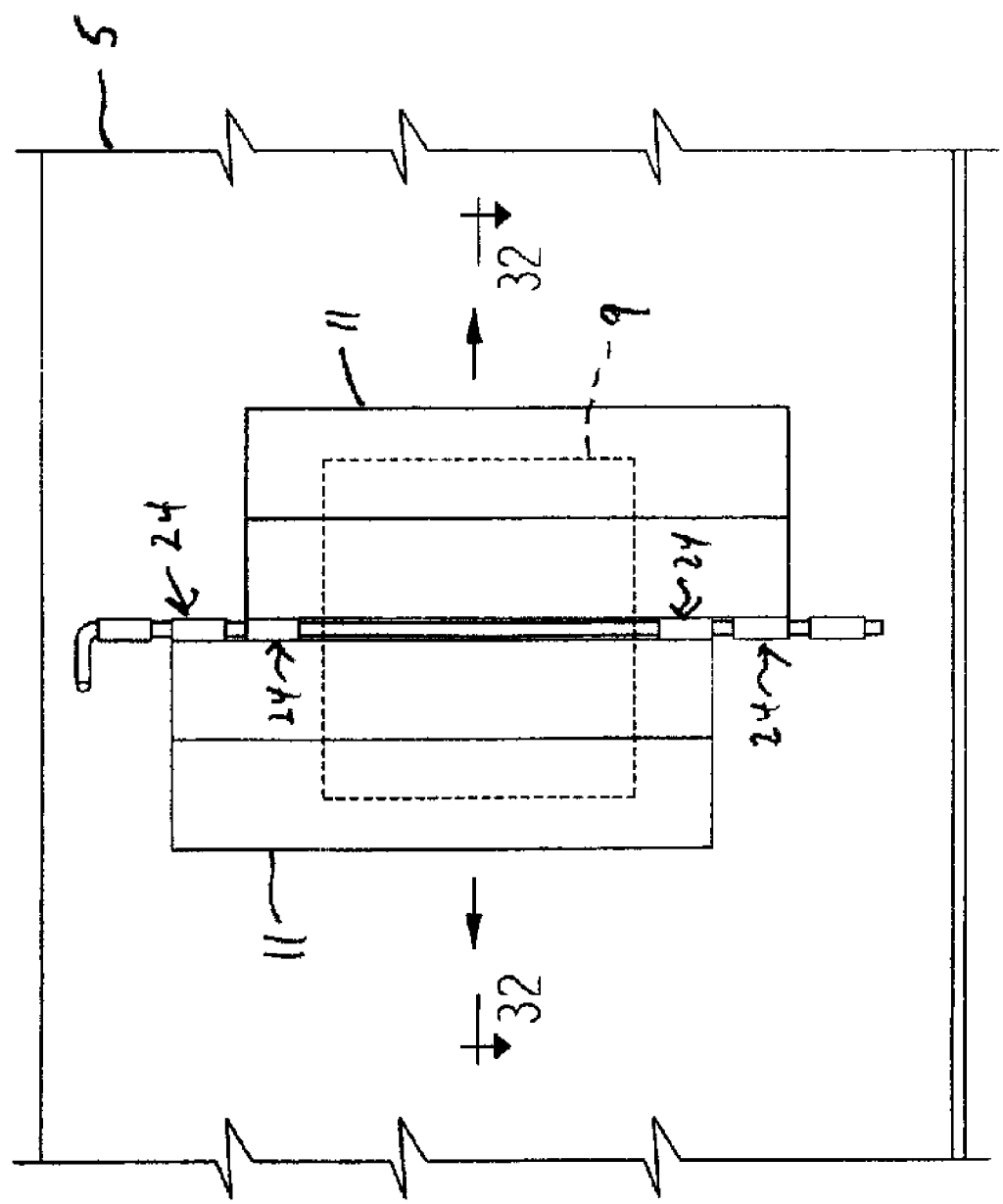
FIG. 31 is a side elevational view of a port of FIG. 1.
Figure 32:
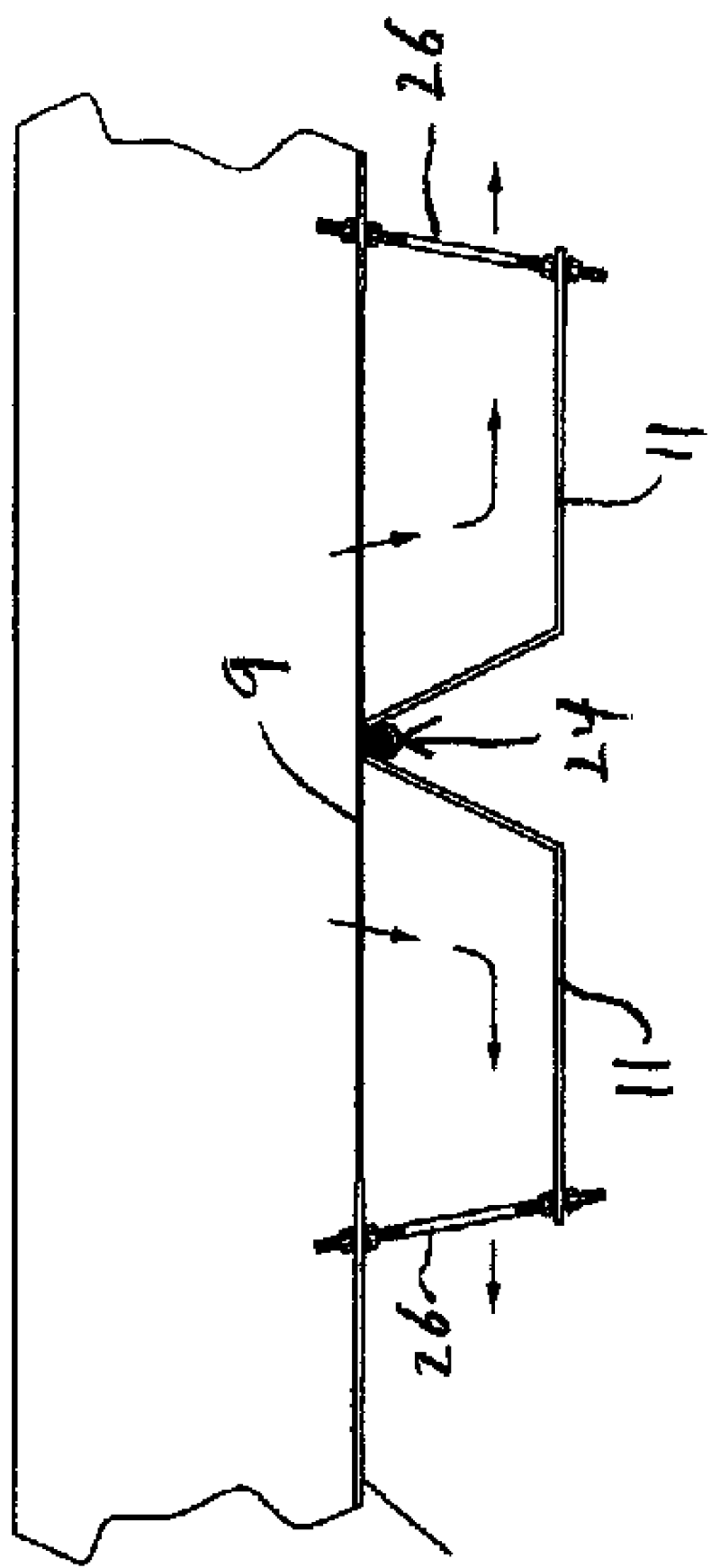
FIG. 32 is a cross-sectional view taken along line 32-32 of FIG. 31.

FIGS. 31 and 32 show two deflectors 11 centered on a single side wall port 9 of FIGS. 1 and 2. In this embodiment, the flow from a single side wall port 9 is divided into two flow streams by the deflectors 11 and the pivot members 24 that are attached to side wall 5. Adjustment mechanisms 26 located on either side of side wall port 9 enable the deflectors 11 to be repositioned to redirect the flow streams from impinging flows to rotational flows. As shown in FIGS. 31 and 32 the port 9 does not include a ligature.

The fluid inlets of this disclosure allow for the dissipation of energy from the influent flow, and uniform and even distribution of the influent within the tank settling volume, by directing flow through a plurality of port clusters, each including two or more ports, that are spaced apart from one another. The flows from adjacent port clusters may be directed in opposite directions and thus impinge upon each other to dissipate fluid flow energy.

The use of ports penetrating the side wall of a well or annular trough in conjunction with a plurality of directional deflectors that divide the flow through each port cluster into respective flow streams is a simple arrangement that may produce impinging flows. By reversing at least one directional deflector of those attached to a port cluster, rotational motion may be imparted to the fluid external to the inlet well, as well as energy dissipation by flow streams impinging upon other flow streams more or less directly head on.

The ports penetrating the bottom wall of a well or annular trough with a plurality of directional deflectors that divide the flow through each port cluster into a plurality of flow streams is also a simple arrangement to produce impinging flows. By reversing at least one directional baffle of one port cluster, rotational motion may be imparted to the fluid external to the bottom wall, as well as energy dissipation by flow streams impinging upon other flow streams more or less directly head on.

The disclosed fluid inlets provide for impinging flows, tangential or rotational flows, radial flows either toward or away from the tank centerline, or combinations of any or all of these flows, as well as allowing direct control of the flow velocity by the adjustment of the directional deflectors position relative to the side or bottom wall through which the ports penetrate.

This wide range of flow directions and adjustable deflector positions is arrived at with less structure than those arrangements that have been attempted previously. Thus at lower expense, a greater efficiency of energy dissipation and rotation control is achieved with improved flow distribution into the tank settling volume. The addition of baffles within the well or trough to redirect flow to the ports increases the ability of the overall fluid inlet to dissipate energy.

It should be realized that the port clusters may also be employed in rectangular basins with peripheral feed arrangements as well as the more conventional feed arrangements. The ports and directional deflectors for any tank or basin type may be of similar or of different shapes and sizes within clusters as required by process considerations.

It should be understood that the disclosed inlets would function either in cooperation with a fixed structure such as in a rectangular collector wherein the inlet well or trough is supported by the basin walls, or in circular collector wherein the inlet well or inlet trough is supported from a bridge or other fixed structure above or below the inlet, or in cooperation with a moving structure such as is found in circular collectors wherein the inlet well or inlet trough is attached to or supported by the collection mechanism driving structure.

Various features of the disclosed inlets have been particularly shown and described in connection with the illustrated embodiments of the disclosure, however, it must be understood that these particular arrangements merely illustrate, and that the invention is to be given its fullest interpretation.

What is claimed is:

1. A fluid inlet for dissipating energy of a fluid that flows through said fluid inlet, said fluid inlet comprising:
    an inlet well including a bottom wall and a first side wall extending upwardly from said bottom wall, said first side wall and said bottom wall forming a chamber;
    a first port cluster and a second port cluster located in said inlet well, each said port cluster including a first port and a second port located in said inlet well generally adjacent one another, each said port being in fluid communication with said chamber, wherein the first port and the second port are spaced closer than the spacing between the first and second port clusters;
    a plurality of first directional deflectors, each said first directional deflector associated with a respective first port; and
    a plurality of second directional deflectors, each said second directional deflector associated with a respective second port;
    whereby said first directional deflector of said first port cluster is adapted to direct fluid flow from said first port of said first port cluster, and said second directional deflector of said second port cluster is adapted to direct fluid flow from said second port of said second port cluster, such that the fluid flow from said first port of said first port cluster and the fluid flow from said second port of said second port cluster are directed toward one another to impinge upon one another and dissipate energy.

2. The fluid inlet of claim 1 wherein said first and second port clusters are located in said first side wall, each said port of said first and second port clusters comprising a side wall port.

3. The fluid inlet of claim 2 wherein said first side wall includes a third port cluster including a first side wall port and a second side wall port, said second directional deflector of said first port cluster adapted to direct fluid flow from said second side wall port of said first port cluster to impinge upon fluid flow from said first side wall port of said third port cluster.

4. The fluid inlet of claim 2 wherein said first directional deflector of said first port cluster is adapted to direct fluid flow from said first port of said first port cluster generally toward the flow of fluid from said second side wall port of said second port cluster, and wherein said second directional deflector of said second port cluster is adapted to direct fluid flow from said second port of said second port cluster generally toward the flow of fluid from said first side wall of said first port cluster.

5. The fluid inlet of claim 2 wherein each said directional deflector includes a first leg attached to said first side wall and a second leg disposed at an angle to said first leg.

6. The fluid inlet of claim 2 wherein each said directional deflector is moveably attached to said first side wall, and said fluid inlet includes an adjustment mechanism for selectively moving said directional deflector with respect to said first side wall.

7. The fluid inlet of claim 2 including a plurality of baffles attached to and extending outwardly from said first side wall, each said baffle being located adjacent a side wall port and between said side wall port and said bottom wall, said baffles adapted to inhibit fluid flow from said side wall ports from flowing downwardly as the fluid flow exits said side wall ports.

8. The fluid inlet of claim 2 wherein each said port cluster includes a ligature separating said first side wall port of said port cluster from said second side wall port of said port cluster, said ligatures being relatively narrow such that said first and second side wall ports of each said port cluster are located closely adjacent to one another.

9. The fluid inlet of claim 8 wherein said first and second directional deflectors of each said port cluster are moveably attached to said ligature of said port cluster.

10. The fluid inlet of claim 2 wherein said first side wall port and said second side wall port of said first port cluster are respectively formed at least in part by said first directional deflector and said second directional deflector of said first port cluster.

11. The fluid inlet of claim 2 including one or more internal directional baffles, each internal directional baffle associated with a respective side wall port, said internal directional baffles being located within said chamber, said internal directional baffles adapted to direct fluid flow from said chamber to said associated side wall port.

12. The fluid inlet of claim 2 wherein said bottom wall includes at least a third port cluster and a fourth port cluster, each said third and fourth port cluster including at least a first bottom wall port and a second bottom wall port, a first directional deflector being respectively associated with each said first bottom wall port and a second directional deflector being respectively associated with each said second bottom wall port, said first directional deflector of said third port cluster adapted to direct fluid flow from said first bottom wall of said third port cluster to impinge upon fluid flow from said second bottom wall port of said fourth port cluster.

13. The fluid inlet of claim 1 including a top wall extending from the top of said first side wall, said first side wall, said bottom wall, and said top wall forming a chamber.

14. The fluid inlet of claim 1 including a top wall extending from the top of said first side wall to the top of a second side wall, said second side wall extending from said bottom wall, said first side wall, said bottom wall, said second side wall, and said top wall forming a chamber.

15. The fluid inlet of claim 1 wherein said first and second port clusters are located in said bottom wall, each port in said first and second port clusters comprising a bottom wall port.

16. The fluid inlet of claim 15 wherein said bottom wall includes a third port cluster including a first bottom wall port and a second bottom wall port, said second directional deflector of said first port cluster adapted to direct fluid flow from said second bottom wall port of said first port cluster to impinge upon fluid flow from said first bottom wall port of said third port cluster.

17. The fluid inlet of claim 1 wherein one or more of said directional deflectors is generally funnel-shaped.

18. A fluid inlet for dissipating energy of a fluid that flows through said fluid inlet, said fluid inlet comprising:

an inlet well including a bottom wall and a first side wall extending upwardly from said bottom wall, said first side wall and said bottom wall forming a chamber;

a first port cluster and a second port cluster located in said inlet well, each said port cluster including a first port and a second port located in said inlet well generally adjacent one another, each said port being in fluid communication with said chamber;

a plurality of first directional deflectors, each said first directional deflector associated with a respective first port; and a plurality of second directional deflectors, each said second directional deflector associated with a respective second port;

whereby said first directional deflector of said first port cluster is adapted to direct fluid flow from said first port of said first port cluster, and said second directional deflector of said second port cluster is adapted to direct fluid flow from said second port of said second port cluster, such that the fluid flow from said first port of said first port cluster and the fluid flow from said second port of said second port cluster are directed toward one another to impinge upon one another and dissipate energy, and wherein said inlet well includes a second side wall extending upwardly from said bottom wall, said second side wall spaced apart from said first side wall, said chamber being located between said first and second side walls, said second side wall including a plurality of spaced apart ports, a directional deflector associated with each said side wall port of said second side wall, whereby said directional deflectors of adjacent pairs of side wall ports of said second side wall are adapted to direct respective flows of fluid from said adjacent pairs of side wall ports of said second side wall toward one another such that the respective fluid flows from said adjacent pairs of side wall ports of said second side wall impinge upon one another and thereby dissipate energy.

19. A fluid inlet for dissipating energy of a fluid that flows through said fluid inlet, said fluid inlet comprising:

an inlet well including a bottom wall and a first side wall extending upwardly from said bottom wall, said first side wall and said bottom wall forming a chamber;

a first port cluster and a second port cluster located in said inlet well, each said port cluster including a first port and a second port located in said inlet well generally adjacent one another, each said port being in fluid communication with said chamber;

a plurality of first directional deflectors, each said first directional deflector associated with a respective first port; and a plurality of second directional deflectors, each said second directional deflector associated with a respective second port;

whereby said first directional deflector of said first port cluster is adapted to direct fluid flow from said first port of said first port cluster, and said second directional deflector of said second port cluster is adapted to direct fluid flow from said second port of said second port cluster, such that the fluid flow from said first port of said first port cluster and the fluid flow from said second port of said second port cluster are directed toward one another to impinge upon one another and dissipate energy;

wherein said first and second port clusters are located in said first side wall, each said port of said first and second port clusters comprising a side wall port, and wherein said inlet well includes a second side wall extending upwardly from said bottom wall, said second side wall including a third port cluster and a fourth port cluster, each said third and fourth port cluster including at least a first side wall port and a second side wall port, a first directional deflector associated with each said first side wall port of said third and fourth port clusters and a second directional deflector associated with each said second side wall port of said third and fourth port clusters, said first directional deflector of said third port cluster adapted to direct fluid flow from said first side wall port of said third port cluster to impinge upon fluid flow from said second side wall port of said fourth port cluster.

20. The fluid inlet of claim 19 wherein said second side wall includes a fifth port cluster including a first side wall port and a second side wall port, said second directional deflector of said third port cluster adapted to direct fluid flow from said second side wall port of said third port cluster to impinge upon fluid flow from said first side wall port of said fifth port cluster.

21. A fluid inlet for dissipating energy of a fluid that flows through said fluid inlet, said fluid inlet comprising:
  a bottom wall;
  a first side wall extending upwardly from said bottom wall, said first side wall and said bottom wall forming a chamber;
  said bottom wall including a first port cluster and a second port cluster, each said port cluster including a first bottom wall port, a second bottom wall port, and a third bottom wall port, each said port being in fluid communication with said chamber;
  a first directional deflector respectively associated with each said first bottom wall port, a second directional deflector respectively associated with each said second bottom wall port, and a third directional deflector respectively associated with each said third bottom wall port, said first directional deflector of said first port cluster adapted to direct fluid flow from said first bottom wall port of said first port cluster to impinge upon fluid flow from said second bottom wall port of said second port cluster, said third directional deflector of each said port cluster adapted to direct fluid flow from said third bottom wall port of said port cluster at an angle to the fluid flow from said first and second directional deflectors of said port cluster;
  whereby said first directional deflector of said first port cluster and said second directional deflector of said second port cluster are adapted to direct respective flows of fluid from said chamber toward one another such that the respective fluid flows impinge upon one another and thereby dissipate energy, and
  wherein said first, second and third bottom wall ports are generally formed as segments of a circle and are separated from one another by ligatures arranged in a generally Y-shape.

22. A method of dissipating energy from fluid flows exiting a fluid inlet, said method comprising the steps of:
  providing a fluid inlet including a plurality of spaced apart port clusters, each port cluster including a plurality of generally adjacent ports, a fluid chamber in communication with said ports of said port clusters, and a plurality of directional deflectors, each directional deflector associated with a respective port of said port clusters, wherein the generally adjacent ports of a cluster are spaced closer than the spacing between the port clusters;
  flowing fluid into said fluid chamber and outwardly through said ports;
  directing the flow of fluid through said ports with said directional deflectors of said adjacent ports of adjacent port clusters toward one another such that the flows of fluid impinge upon one another and thereby dissipate energy.

23. The method of claim 22 wherein said fluid inlet includes a plurality of spaced apart port clusters, each said port cluster including a first port and a second port, a first directional deflector associated with each said first port, and a second directional deflector associated with each said second port, said first directional deflector of a first port cluster directing a flow of fluid toward a flow of fluid from a second directional deflector of a second port cluster such that the fluid flows impinge upon one another, and said second directional deflector of said first port cluster is adapted to direct flow of fluid from said chamber toward the flow of fluid from said first directional deflector of said first port cluster in a substantially common direction such that the respective fluid flows merge with one another and thereby impart controllable directional rotation to the fluid discharged from the inlet.

24. A fluid inlet for dissipating energy of a fluid that flows through said fluid inlet, said fluid inlet comprising:
  a bottom wall;
  a side wall attached to said bottom wall, said bottom wall and said side wall forming a chamber;
  a port cluster located in said fluid inlet, said port cluster including a first port, a second port and a ligature separating said first port from said second port, wherein the first port and the second port are spaced closer than the spacing between the port cluster and any other port cluster;
  a first directional deflector attached to said ligature and adapted to direct fluid flow from said first port;
  a second directional deflector attached to said ligature and adapted to direct fluid flow from said second port.

25. The fluid inlet of claim 24 including a first pivot member attaching said first directional deflector to said ligature, and a second pivot member attaching said second directional deflector to said ligature, said first and second directional deflectors being moveable with respect to said ligature.

26. The fluid inlet of claim 24 wherein said ligature is narrower than said first port.

27. The fluid inlet of claim 24 wherein said ligature comprises a portion of one of said side wall and said bottom wall.

28. A fluid inlet for dissipating energy of a fluid that flows through said fluid inlet, said fluid inlet comprising:
  a bottom wall;
  a first side wall extending upwardly from said bottom wall, said first side wall and said bottom wall forming a chamber;
  said bottom wall including a first port cluster and a second port cluster, each said port cluster including a first bottom wall port, a second bottom wall port, and a third bottom wall port, each said port being in fluid communication with said chamber, wherein the first bottom wall port and the second bottom wall port are spaced closer than the spacing between the first and second port clusters;
  a first directional deflector respectively associated with each said first bottom wall port, a second directional deflector respectively associated with each said second bottom wall port, and a third directional deflector respectively associated with each said third bottom wall port, said first directional deflector of said first port cluster adapted to direct fluid flow from said first bottom wall port of said first port cluster to impinge upon fluid flow from said second bottom wall port of said second port cluster, said third directional deflector of each said port cluster adapted to direct fluid flow from said third bottom wall port of said port cluster at an angle to the fluid flow from said first and second directional deflectors of said port cluster;

whereby said first directional deflector of said first port cluster and said second directional deflector of said second port cluster are adapted to direct respective flows of fluid from said chamber toward one another such that the respective fluid flows impinge upon one another and thereby dissipate energy.

29. A fluid inlet for dissipating energy of a fluid that flows through said fluid inlet, said fluid inlet comprising:

an inlet well including a bottom wall and a first side wall extending upwardly from said bottom wall, said first side wall and said bottom wall forming a chamber;

a first port cluster and a second port cluster located in said inlet well, each said port cluster including a first port and a second port located in said inlet well generally adjacent one another, each said port being in fluid communication with said chamber;

a plurality of first directional deflectors, each said first directional deflector associated with a respective first port; and a plurality of second directional deflectors, each said second directional deflector associated with a respective second port;

whereby said first directional deflector of said first port cluster is adapted to direct fluid flow from said first port of said first port cluster, and said second directional deflector of said second port cluster is adapted to direct fluid flow from said second port of said second port cluster, such that the fluid flow from said first port of said first port cluster and the fluid flow from said second port of said second port cluster are directed toward one another to impinge upon one another and dissipate energy;

wherein said first and second port clusters are located in said first side wall, each said port of said first and second port clusters comprising a side wall port, and wherein said first side wall includes a third port cluster including a first side wall port and a second side wall port, said second directional deflector of said first port cluster adapted to direct fluid flow from said second side wall port of said first port cluster to impinge upon fluid flow from said first side wall port of said third port cluster;

said second directional deflector of said third port cluster adapted to direct fluid flow from said second side wall port of said third port cluster to impinge upon fluid flow from said second directional deflector of said first port cluster;

whereby said second directional deflector of said third port cluster and said second directional deflector of said first port cluster are adapted to direct respective flows of fluid from said chamber toward a substantially common direction such that the respective fluid flows merge with one another and thereby impart controllable directional rotation to the fluid discharged from the inlet.

30. A fluid inlet for dissipating energy of a fluid that flows through said fluid inlet, said fluid inlet comprising:

an inlet well including a bottom wall and a first side wall extending upwardly from said bottom wall, said first side wall and said bottom wall forming a chamber;

a first port cluster and a second port cluster located in said inlet well, each said port cluster including a first port and a second port located in said inlet well generally adjacent one another, each said port being in fluid communication with said chamber;

a plurality of first directional deflectors, each said first directional deflector associated with a respective first port; and a plurality of second directional deflectors, each said second directional deflector associated with a respective second port;

whereby said first directional deflector of said first port cluster is adapted to direct fluid flow from said first port of said first port cluster, and said second directional deflector of said second port cluster is adapted to direct fluid flow from said second port of said second port cluster, such that the fluid flow from said first port of said first port cluster and the fluid flow from said second port of said second port cluster are directed toward one another to impinge upon one another and dissipate energy, wherein said first and second port clusters are located in said bottom wall, each said port in said first and second port clusters comprising a bottom wall port, and wherein said first bottom wall includes a third port cluster including a first bottom wall port and a second bottom wall port, said second directional deflector of said first port cluster adapted to direct fluid flow from said second bottom wall port of said first port cluster to impinge upon fluid flow from said first bottom wall port of said third port cluster;

said second directional deflector of said third port cluster adapted to direct fluid flow from said second bottom wall port of said third port cluster to impinge upon fluid flow from said second directional deflector of said first port cluster;

whereby said second directional deflector of said third port cluster and said second directional deflector of said first port cluster are adapted to direct respective flows of fluid from said chamber toward a substantially common direction such that the respective fluid flows merge with one another and thereby impart controllable directional rotation to the fluid discharged from the inlet.

* * * * *